(12) United States Patent
Lambotte

(10) Patent No.: US 12,499,240 B2
(45) Date of Patent: Dec. 16, 2025

(54) APPARATUS AND METHOD FOR ENHANCING CYBERSECURITY OF AN ENTITY

(71) Applicant: Tom Lambotte, Chardon, OH (US)

(72) Inventor: Tom Lambotte, Chardon, OH (US)

(73) Assignee: Tom Lambotte, Beachwood, OH (US)

( * ) Notice: Subject to any disclaimer, the term of this patent is extended or adjusted under 35 U.S.C. 154(b) by 167 days.

(21) Appl. No.: 18/385,672

(22) Filed: Oct. 31, 2023

(65) Prior Publication Data

US 2024/0265114 A1   Aug. 8, 2024

Related U.S. Application Data

(63) Continuation-in-part of application No. 18/107,181, filed on Feb. 8, 2023, now Pat. No. 11,829,486.

(51) Int. Cl.
*G06F 21/57*   (2013.01)
*G06F 21/56*   (2013.01)

(52) U.S. Cl.
CPC .......... *G06F 21/577* (2013.01); *G06F 21/566* (2013.01); *G06F 2221/034* (2013.01)

(58) Field of Classification Search
CPC . G06F 21/577; G06F 21/566; G06F 2221/034
See application file for complete search history.

(56) References Cited

U.S. PATENT DOCUMENTS

| | | | |
|---|---|---|---|
| 10,243,904 B1 | 3/2019 | Wescoe et al. | |
| 10,438,001 B1 | 10/2019 | Hariprasad | |
| 10,681,074 B2 | 6/2020 | Crabtree et al. | |
| 11,031,135 B2 | 6/2021 | Gates | |
| 11,138,312 B2* | 10/2021 | Hadar | G06N 3/006 |
| 11,194,915 B2* | 12/2021 | Stolfo | H04L 67/306 |
| 11,288,364 B1 | 3/2022 | Savir | |
| 11,451,575 B2 | 9/2022 | Baragaba | |
| 11,500,999 B2 | 11/2022 | Spisak et al. | |
| 2017/0104778 A1 | 4/2017 | Shabtai et al. | |
| 2020/0177612 A1 | 6/2020 | Kras et al. | |
| 2020/0364347 A1* | 11/2020 | Lewis | G06N 20/00 |
| 2021/0334386 A1 | 10/2021 | Alghamdi et al. | |
| 2021/0390181 A1 | 12/2021 | Mcclay | |
| 2022/0345467 A1* | 10/2022 | Algarawi | G06F 21/565 |
| 2023/0009127 A1* | 1/2023 | Boyer | H04L 63/1441 |
| 2023/0081399 A1 | 3/2023 | Murphy | |

(Continued)

FOREIGN PATENT DOCUMENTS

| | | | | |
|---|---|---|---|---|
| CN | 113222074 B | * | 8/2023 | ........... G06F 18/214 |
| EP | 3930286 A1 | * | 12/2021 | ............. H04L 51/42 |
| WO | WO2017210736 A1 | | 12/2017 | |

*Primary Examiner* — Christopher A Revak
(74) *Attorney, Agent, or Firm* — Caldwell Intellectual Property Law

(57) ABSTRACT

An apparatus and method for enhancing cybersecurity of an entity, wherein the apparatus includes at least a processor and a memory containing instructions configuring the at least a processor to receive entity data including cybersecurity related data from an entity, compare the entity data to a cybersecurity metric, generate a cybersecurity enhancement program as a function of the comparison, wherein the cybersecurity enhancement program includes a cyber-attack simulation, and implement the cybersecurity enhancement program for the entity based on the entity data.

20 Claims, 9 Drawing Sheets

(56) References Cited

U.S. PATENT DOCUMENTS

| | | | |
|---|---|---|---|
| 2024/0338445 A1* | 10/2024 | Popa | G06F 21/564 |
| 2024/0414190 A1* | 12/2024 | Lal | H04L 63/1425 |
| 2025/0036778 A1* | 1/2025 | Chan | G06F 21/577 |

* cited by examiner

APPARATUS AND METHOD FOR ENHANCING CYBERSECURITY OF AN ENTITY

CROSS-REFERENCE TO RELATED APPLICATIONS

This application is a continuation-in-part of Non-provisional application Ser. No. 18/107,181 filed on Feb. 8, 2023, and entitled "AN APPARATUS AND METHOD FOR ENHANCING CYBERSECURITY OF AN ENTITY," the entirety of which is incorporated herein by reference.

FIELD OF THE INVENTION

The present invention generally relates to the field of cybersecurity. In particular, the present invention is directed to an apparatus and method for enhancing cybersecurity of an entity.

BACKGROUND

An individual or an organization is at higher risk of a cyber-attack if the individual or the organization lack certainty in their current security measures but doesn't have the time or skill to audit and improve their cybersecurity. An automated solution is needed for preventing personal or organizational data breach with multi-layer protection in minimal time. Existing solutions are not satisfactory.

SUMMARY OF THE DISCLOSURE

In an aspect, an apparatus for enhancing cybersecurity of an entity, wherein the apparatus includes at least a processor and a memory containing instructions configuring the at least a processor to receive an entity prompt from an entity, receive entity data including cybersecurity related data from the entity, generate a cybersecurity enhancement program as a function of the entity prompt, wherein generating the cybersecurity enhancement program includes comparing the entity data to a cybersecurity metric, simulate a cyber-attack to the entity data as a function of the cybersecurity enhancement program using a cyber-attack simulation module, monitor at least a change in the entity data as a function of the cyber-attack simulation, generate a prompt response as a function of the at least a change in the entity data, wherein the prompt response includes a cybersecurity report and display the prompt response through a visual interface of an entity device of the entity.

In another aspect, a method for enhancing cybersecurity of an entity, wherein the method includes receiving, using at least a processor, an entity prompt from an entity, receiving, using the at least a processor, entity data including cybersecurity related data from the entity, generating, using the at least a processor, a cybersecurity enhancement program as a function of the entity prompt, wherein generating the cybersecurity enhancement program includes comparing the entity data to a cybersecurity metric, simulating, using the at least a processor, a cyber-attack to the entity data as a function of the cybersecurity enhancement program using a cyber-attack simulation module, monitoring, using the at least a processor, at least a change in the entity data as a function of the cyber-attack simulation, generating, using the at least a processor, a prompt response as a function of the at least a change in the entity data, wherein the prompt response includes a cybersecurity report and displaying, using the at least a processor, the prompt response through a visual interface of an entity device of the entity.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
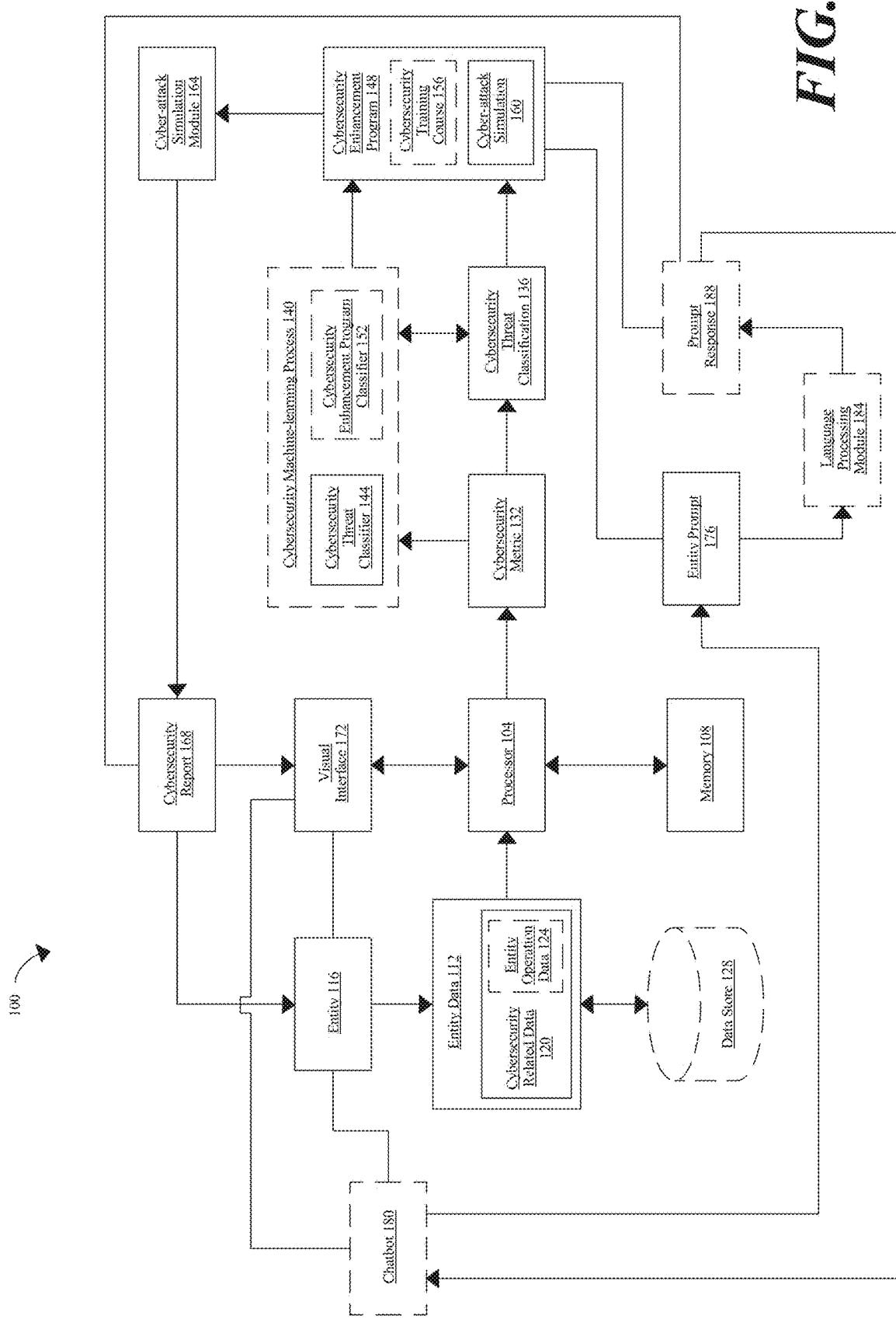
FIG. 1 illustrates a block diagram of an exemplary embodiment of an apparatus for enhancing cybersecurity for an entity.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and method for enhancing cybersecurity of an entity. In an embodiment, enhancing cybersecurity includes generating and implementing a cybersecurity enhancement program.

Aspects of the present disclosure can be used to detect cybersecurity threats for the entity. Aspects of the present disclosure can also be used to remediate cyber-attacks. This is so, at least in part, because apparatus and method include multi-layer protection for the entity provided by the generated cybersecurity enhancement program.

Aspects of the present disclosure allow for updating the cybersecurity enhancement program for the entity based on a cybersecurity report generated during a cyber-attack simulation on the entity. Exemplary embodiments illustrating aspects of the present disclosure are described below in the context of several specific examples.

In an embodiment, apparatus and methods described herein may include one or more aspects of cybersecurity. As used in this disclosure, "cybersecurity" is a practice of protecting systems, networks, and/or programs from "cyber-attacks," which are actions from a malicious entity that aimed at accessing, changing, or otherwise destroying sensitive information, properties, or otherwise business processes from the systems, networks, and/or programs. In some embodiments, cyber-attack may include producing one or more cybersecurity threats. In some cases, cyber-attack may include, without limitation, Malware attack, Phishing attack, Password attack, Main-in-the-Middle attack, SQL injection attack, Denial-of-Service attack, Insider threat, crypto jacking, Zero-Day exploit, Watering hole attack, and the like thereof. In a non-limiting example, cybersecurity threats may include threats from "phishing" which is a practice of sending fraudulent messages; for instance, phishing emails that resemble emails from reputable sources and steal sensitive data such as without limitation, login credentials, credit card numbers, account information, and the like thereof. In a non-limiting example, cybersecurity threats may include threats from "social engineering" which is a tactic that trick entity into revealing sensitive data. Threats from social engineering may include combining with any cybersecurity threats described herein; for instance, social engineering may make an entity more likely to click on phishing links, download malwares, trust malicious sources, or the like. In a non-limiting example, cybersecurity threats may include threats from a "ransomware" which is a type of malicious software designed to extort properties by blocking access to files, systems, networks, and the like until ransom is paid. In some cases, paying ransom may not guarantee that access will be restored or recovered. In a non-limiting example, cybersecurity threats may include threats from a "malware" which is a type of software designed to gain unauthorized access and/or cause damage to computing device, networks, programs, and/or the like. In some embodiments, cybersecurity may include multiple layers of protection spread across and protecting, a plurality of computing devices, networks, programs, or data that one entity intends to keep private and/or safe from cybersecurity threats described above. In a non-limiting example, multiple layers of protection may include a plurality of lays of operations on protected computing devices, networks, programs, or data such as, without limitation, cyber-attack detection, cyber-attack investigation, cybersecurity remediation, and the like thereof. Multiple layers of protection may include any processing step described in this disclosure.

In an embodiment, apparatus and methods described herein may perform or implement one or more aspects of a cryptographic system for cybersecurity. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, apparatus and methods described herein produce cryptographic hashes for cybersecurity, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof, for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof Zero-knowledge proof may include, without limitation, bulletproofs. Zero-knowledge proof may include a homomorphic public-key cryptography (hPKC)-based proof Zero-knowledge proof may include a discrete logarithmic problem (DLP) proof. Zero-knowledge proof may include a secure multi-party computation (MPC) proof Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus 100 for enhancing cybersecurity for an entity is illustrated. Apparatus 100 includes at least a processor 104 and a memory 108 communicatively connected to the at least a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 is configured to receive entity data 112 from an entity 116. As used in this disclosure, "entity data" are data related to an entity 116. "Entity," as described herein, is an independent existence. In some cases, entity 116 may include an individual. For example, entity 116 may include an individual such as, without limitation, a user, an employee, an administrator, and the like. In other cases, entity 116 may include a device, a system, or otherwise a component an independent individual is presently using or equipped. In a non-limiting example, entity 116 may include a computing device. Computing device may include a computing device described in this disclosure, such as, without limitation, a desktop, a laptop, a mobile device, anFd the like thereof. In some embodiments, entity 116 may include an independent group of existences. In a non-limiting example, entity 116 may include a team, small business, organization, company, and the like thereof. In another non-limiting example, entity 116 may include a workstation, a server, a network, and the like thereof. Additionally, or alternatively, entity 116 may be distinct. For instance, without limitation, a first entity may include existences and/or entity data different from a second entity.

With continued reference to FIG. 1, in some embodiments, without limitation, entity data 112 of entity 116 may include personal information. In a non-limiting example, personal information may include identity information of entity 116 such as, without limitation, name, age, gender, address, social security number, and the like thereof. In another non-limiting example, personal information may include account information of entity 116 such as, without limitation, account login credentials, credit card number, billing address, and the like thereof. In a further non-limiting example, personal information may include communication information of entity 116 such as, without limitation, text messages, voice messages, emails, notifications, communication histories, and the like thereof. In other non-limiting examples, personal information may include media information of entity 116 such as, without limitation, social media posts, media feeds and feed contents, blogs, connections, and the like thereof.

With continued reference to FIG. 1, in other embodiments, without limitation, entity data 112 of entity 116 may include device information. In a non-limiting example, device information may include hardware information such as, without limitation, information regarding to central processing unit (CPU), random access memory (RAM), data storage, graphics processing unit (GPU), display, mouse, keyboard, and the like thereof. For instance, and without limitation, hardware information may include available RAM, available data storage space, number of cores, number of threads, device model number, information of any device/component described in this disclosure, and the like thereof. In another non-limiting example, device information may include software information such as, without limitation, dependencies, software version, package content, file type, program size, installation method, information of any program/software described in this disclosure, and the like thereof. In other non-limiting examples, device information may include configuration information such as, without limitation, device connection configurations, network configurations, authentication configurations, account configurations, program configurations, configurations of any device/component described in this disclosure, and the like thereof.

With continued reference to FIG. 1, entity data 112 includes cybersecurity related data 120. As used in this disclosure, "cybersecurity related data" is data related to the cybersecurity of entity 116. Cybersecurity related data 120 may include personal information and/or device information described above. In some embodiments, cybersecurity related data 120 may include data that potentially identifies one or more cybersecurity threats described above. In a non-limiting example, cybersecurity related data may include a plurality of system configurations such as, without limitation, firewall configurations that allow for the presence of security vulnerabilities. In another non-limiting example, cybersecurity related data may include knowledge of entity 116 understanding and/or following security standards. As used in this disclosure, "security standards" are rules that provide consistency, accountability, and/or efficiency to one or more products and/or processes. In some embodiments, security standard may include an information security standard provided by Center for Information Security (CIS) or the National Institute of Standards and Technology (NIST) regarding critical security controls. In a non-limiting example, security standard may include a most recent version of the International Organization for Standardization (ISO) 27001 standard. In another non-limiting example, a security standard may include an action that protects entity 116 form cybersecurity threats described above. Cybersecurity related data may include entity's understanding on one or more security standards and following theses security standards; for instance, steps entity 116 take for certain process that ensures data security. Additionally, or alternatively, cybersecurity related data 120 may include data that introduce one or more security standard violations such as, without limitation, data breach, SQL injection, HTTP smuggling, and the like. In a non-limiting example, cybersecurity related data 120 may include one or more malicious web request from a malicious source received by entity 116 (i.e., server).

With continued reference to FIG. 1, in some embodiments, cybersecurity related data 120 may include entity operation data 124. As used in this disclosure, "entity operation data" are data related to an operation of entity 116. In some cases, operation of entity 116 may include one or more operations of entity 116 on device and/or system within entity 116. In a non-limiting example, entity operation data 124 may include data produced from operating one or more devices, managing a plurality of devices, manipulating a plurality of system configurations and/or device configurations, and the like thereof. Entity operation data 124 may include data such as, without limitation, system log, program log, source files, browser histories, and the like produced by entity 116 operating one or more devices. In some cases, operation of entity 116 may include one or more business operations of entity 116. In a non-limiting example, entity operation data 124 may include a business procedure, where in the business procedure is a document that instructs entity 116 (i.e., employee) on executing one or more activities of a business process; for instance, without limitation, negotiation, receiving orders, order delivery, billing, payment, and the like thereof. Additionally, or alternatively, entity operation data 124 may include information regarding to one or more personal behaviors of entity 116. In a non-limiting example, entity operation data 124 may include a recorded list of steps adopted by entity 116 to comply with security standards. In another non-limiting example, entity operation data 124 may include data from a business record of entity 116, wherein the business record is a document that records an act, condition, or event related to business operate by entity 116. Business record may include, without limitation, business hours, meeting minutes, employment contract, accounting source documents, memoranda, and the like thereof. In some embodiments, entity data 112 may include data related to usage of application programming interface (API). As used herein, an "application programming interface" is a set of functions that allow applications to access data and interact with external software components, operating systems, or microdevices, such as another web application or computing device. As a non-limiting example, entity data 112 may include API requests. As a non-limiting example, API may include REST, SOAP, GraphQL, or the like. In some embodiments, processor 104 may be configured to implement APIs.

With continued reference to FIG. 1, in some embodiments, entity data 112 and/or any data/information described in this disclosure may be present as a vector. As used in this disclosure, a "vector" is a data structure that represents one or more quantitative values and/or measures of home resource data. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes.

With continued reference to FIG. 1, in some embodiments, entity data 112 and/or any other data/information described in this disclosure may be present as a dictionary. As used in this disclosure, a "dictionary" is a data structure containing an unordered set of key value pairs. In this disclosure, a "key value pair" is a data representation of a data element such as, without limitation, entries of personal information, device information, cybersecurity related data 120, entity operation data 124, any other information within entity data 112, and the like thereof. In some cases, dictionary may be an associative memory, or associative arrays, or the like thereof. In a non-limiting example, dictionary may be a hash table. In an embodiment, kay value pair may include a unique key, wherein the unique kay may associate with one or more values. In another embodiment, key value pair may include a value, wherein the value may associate with a single key. In some cases, each key value pair of set of key value pairs in dictionary may be separated by a separator, wherein the separator is an element for separating two key value pairs. In a non-limiting example, separator may be a comma in between each key value pairs of plurality of key value pairs within dictionary. In another non-limiting example, a dictionary may be expressed as "{first key value pair, second key value pair}," wherein the first key value pair and the second key value pair may be separate by a comma separator, and wherein both first key value pair and second key value pair may be expressed as "first/second key: first/second value." In a further non-limiting example, entity data may be present as a dictionary: "{x: A, y: B}," wherein x may be a first entry correspond to a first cybersecurity related data A and y may be a second entry correspond to a second cybersecurity related data B. Additionally, or alternatively, dictionary may include a term index, wherein the term index is a data structure to facilitate fast lookup of entries within dictionary (i.e., index). In some cases, without limitation, term index may use a zero-based indexing, wherein the zero-based indexing may configure dictionary to start with index 0. In some cases, without limitation, term index may use a one-based indexing, wherein the one-based indexing may configure dictionary to start with index 1. In other cases, without limitation, term index may use a n-based indexing, wherein the n-based indexing may configure dictionary to start with any index from 0 to n. Further, term index may be determined/calculated using one or more hash functions. As used in this disclosure, a "hash function" is a function used to map a data of arbitrary size to a fixed-size value. In some cases, a fixed-size value may include, but is not limited to, hash value, hash code, hash digest, and the like. In a non-limiting example, entity data 112 may be present as a dictionary containing a plurality of hashes generated using hash function such as, without limitation, identity hash function, trivial hash function, division hash function, word length folding, and the like, wherein each hash of plurality of hashes may represents a single entry of cybersecurity related data 120 within entity data 112.

With continued reference to FIG. 1, in other embodiments, entity data 112 and/or any other data/information described in this disclosure may be present as any other data structure such as, without limitation, tuple, single dimension array, multi-dimension array, list, linked list, queue, set, stack, dequeue, stream, map, graph, tree, and the like thereof. In some embodiments, entity data 112 and/or any other data/information described in this disclosure may be present as a combination of more than one above data structures. In a non-limiting example, entity data 112 may include a dictionary of lists, wherein each list within the dictionary may include a plurality of list items representing entity operation data 124, and wherein each list within dictionary may represent cybersecurity related data. As will be appreciated by persons having ordinary skill in the art, after having read the entirety of this disclosure, the foregoing list is provided by way of example and other data structures can be added as an extension or improvements of apparatus 100 disclosed herein. In some embodiments, without limitation, data structure may include an immutable data structure, wherein the immutable data structure is a data structure that cannot be changed, modified, and/or updated once data structure is initialized. In other embodiments, without limitation, data structure may include a mutable data structure, wherein the mutable data structure is a data collection that can be changed, modified, and/or updated once data structure is initialized. Additionally, or alternatively, entity data 112 and/or any other data/information described in this disclosure may include an electric file format such as, without limitation, txt file, JSON file, XML file, word document, pdf file, excel sheet, image, video, audio, and the like thereof.

With continued reference to FIG. 1, in some cases, data within data structure described above may be sorted in a certain order such as, without limitation, ascending order, descending order, and the like thereof. In a non-limiting example, sorting entity data 112 may include using a sorting algorithm. In some cases, sorting algorithm may include, but is not limited to, selection sort, bubble sort, insertion sort, merge sort, quick sort, heap sort, radix sort, and the like thereof. In a non-limiting example, cybersecurity related data 120 within entity data 112 may be sorted in a chronological order based on receiving time stamps. As will be appreciated by persons having ordinary skill in the art, after having read the entirety of this disclosure, the foregoing list is provided by way of example and other sorting algorithm can be added as an extension or improvements of apparatus 100 disclosed herein.

With continued reference to FIG. 1, receiving entity data 112 may include accepting a cybersecurity assessment. As used in this disclosure, a "cybersecurity assessment" is an evaluation of cybersecurity of entity 116. In some embodiments, without limitation, cybersecurity assessment may include a manual evaluation of entity 116. Manual evaluation may include manually collecting entity data 112 from entity 116. In a non-limiting example, accepting cybersecurity assessment may include performing cybersecurity assessment by a cybersecurity professional such as, without limitation, data analyst, data scientist, cybersecurity engineer, and the like thereof. In some cases, cybersecurity assessment may be performed by a cybersecurity professional on-site; for instance, collecting entity data 112 from entity 116 by the cybersecurity professional in-person. In other cases, performing cybersecurity assessment may include collecting, by cybersecurity professional, entity data 112 from entity 116 remotely; for instance, entity data 112 of entity 116 may be received remotely through a remote connection on the network such as, without limitation, a remote call. In some embodiments, cybersecurity assessment may include a set of questions regarding cybersecurity. In a non-limiting example, receiving entity data 112 may include recording a set of answers to set of questions within cybersecurity assessment submitted by entity 116, wherein the set of answers may include entity data 112. In some cases, questions may include questions regarding understanding and/or implementation of security standard described above. In other cases, questions may include questions regarding the content of cybersecurity training course 156 described in further detail below. Cybersecurity assessment may be predetermined by cybersecurity professional. In some embodiments, cybersecurity assessment may be in a form such as, without limitation, survey, interview, report, events monitoring, and the like thereof. In some embodiments, cybersecurity assessment may include a data submission of one or more documentations from entity 116. As used in this disclosure, a "data submission" is an assemblage of data provided by entity 116 as an input source. In a non-limiting example, data submission may include entity 116 (i.e., user) uploading a user profile to processor 104, wherein the user profile may be a collection of personal information of entity 116. As used in this disclosure, a "documentation" is a source of information. In some cases, documentation may include electronic documents, such as, documents in electronic format described above. In a non-limiting example, documentation may include entity data 112, and may be an input source of data submission for further processing. Further processing may include any processing step described below in this disclosure. Cybersecurity assessment may be accepted through visual interface 172 described below.

With continued reference to FIG. 1, additionally, or alternatively, cybersecurity assessment may include an automated evaluation of entity 116. Automated evaluation may include automatically collecting entity data 112 from entity 116. In a non-limiting example, processor 104 may be configured to run a security process, wherein the security process is an instance of a computer program that is being executed by one or more threads configured to extract entity data 112 from one or more components, systems, or otherwise devices within entity 116; for instance, processor 104 may utilize a security software and/or application programming interface (API) configured to determine whether system structure, endpoints, access point, system configurations, any other aspects of entity 116 comply within one or more security standards described above.

With continued reference to FIG. 1, in some embodiments, network may include, participate in, and/or be incorporated in a network topology. A "network topology" as used in this disclosure is an arrangement of elements of a communication network. In some embodiments, network may include, but is not limited to, a star network, tree network, and/or a mesh network. A "mesh network" as used in this disclosure is a local network topology in which a network node connects directly, dynamically, and non-hierarchically to as many other network nodes as possible. Network nodes of network may be configured to communicate in a partial mesh network. A partial mesh network may include a communication system in which some network nodes may be connected directly to one another while other network nodes may need to connect to at least another network node to reach a third network node. In some embodiments, network may be configured to communicate in a full mesh network. A full mesh network may include a communication system in which every network node in the network may communicate directly to one another. In some embodiments, network may include a layered data network. As used in this disclosure a "layered data network" is a data network with a plurality of substantially independent communication layers with each configured to allow for data transfer over predetermined bandwidths and frequencies. As used in this disclosure a "layer" is a distinct and independent functional and procedural tool of transferring data from one location to another. For example, and without limitation, one layer may transmit entity data 112 at a particular frequency range while another layer may transmit entity data 112 at another frequency range such that there is substantially no cross-talk between the two layers which advantageously provides a redundancy and safeguard in the event of a disruption in the operation of one of the layers. A layer may be an abstraction which is not tangible. Additionally, or alternatively, network may include other networks such as, without limitation, bus network, ring network, fully connected network, and the like thereof.

With continued reference to FIG. 1, in some embodiments, entity data 112 may be received and/or stored in a data store 128 such as, without a limitation, a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, apparatus 100 may include a cloud environment. As used in this disclosure, a "cloud environment" is a set of systems and/or processes acting together to provide services in a manner that is dissociated with underlaying hardware and/or software within apparatus 100 used for such purpose and includes a cloud. Hardware and/or software may include any hardware and/or software described in this disclosure. A "cloud," as described herein, refers to one or more devices (i.e., servers) that are accessed over the internet. In some cases, cloud may include Hybrid Cloud, Private Cloud, Public Cloud, Community Cloud, any cloud defined by National Institute of Standards and Technology (NIST), and the like thereof. In some embodiments, cloud may be remote to apparatus 100; for instance, cloud may include a plurality of functions distributed over multiple locations external to apparatus 100. Location may be a data center. In a non-limiting example, software and/or data store 128 may run on one or more cloud servers. Entity data 116 stored in data store 128 may not be found in local storage of apparatus 100. In some embodiments, cloud environment may include implementation of cloud computing. As used in this disclosure, "cloud computing" is an on-demand delivery of information technology (IT) resources within a network through internet, without direct active management by entity 116. In some embodiment, without limitation, cloud computing may include a Software-as-a-Service (SaaS). As used in this disclosure, a "Software-as-a-Service" is a cloud computing service model which make software available to entity 116 directly; for instance, SaaS platform may provide partial or entire set of functionalities of one or more software to entity 116 without direct installation. In a non-limiting example, data store 128 may be disposed in a SaaS platform. Receiving entity data 112 may include storing entity data 112 in SaaS platform such as, without limitation, MICROSOFT 365, SALESFORCE, DROPBOX, G SUITE, and the like thereof. In some embodiments, data store 128 may be configured to backup stored data such as, without limitation, entity data 112 through cloud-to-cloud backup. Continuing the example, SaaS platform may be configured to create a plurality of copies of stored entity data 112 and storing the plurality of copies of stored entity data 112 in another public cloud such as, without limitation, AWS.

With continued reference to FIG. 1, as used in this disclosure, a "network" is a plurality of computing device sharing resources located on or provided by one or more network nodes. In some cases, network may include a wired network. In other cases, network may include a wireless network. In some embodiments, network may include, without limitation, personal area network (PAN), local area network (LAN), mobile ad hoc network (MANET), metropolitan area network (MAN), wide area network (WAN), cellular network, global area network (GAN), space network, and the like. As used in this disclosure, a "network node" is a node as a redistribution point in wireless network. In an embodiment, the network node may be a communication endpoint. In a non-limiting example, receiving entity data 112 may include receiving entity data 112 from one or more network nodes. Network nodes may include data store 128 and/or in communication with data store 128 within network. Communication with data store 128 may include transmission one or more network packets between networks and/or within network; for instance, one or more network packets may be transmitted through the internet. As used in this disclosure, a "network packet" is a unit of data that transfers over the network. Network packet may include, but is not limited to, packet header, payload, signature, transferred data, and the like. Network may also include an open systems interconnection (OSI) model, wherein the OSI model further organized a plurality of functions of data communications by segregating the plurality of functions into a plurality of layers. In some cases, layers may include, without limitation, application layer, presentation layer, session layer, transport layer, network layer, data link layer, physical layer, and the like.

With continued reference to FIG. 1, in some embodiments, network may include a firewall. As used in this disclosure, a "firewall" is a network component for securing network connections and controlling access rules. In some embodiments, firewall may include a computer software; for instance, an internet security software. In other embodiments, firewall may be inserted in between plurality of networks. In some cases, firewall may be configured to reject access request from unrecognized source. In other cases, firewall may be configured to accept access request from recognized source. In a non-limiting example, firewall may include a secure gateway. As used in this disclosure, a "secure gateway" is an on-premises and/or cloud-delivered network security service. In some embodiments, secure gateway may be disposed between entity 116 and/or apparatus 100 and internet. Continuing the example, secure gateway may provide a network protection, wherein the network protection may include inspecting a web request against security standards to ensure malicious activities are blocked and inaccessible. In some cases, secure gateway may include an implementation of one or more aspects of a cryptographic system described above.

With continued reference to FIG. 1, in another non-limiting example, data store 128 may include secure gateway. As used in this disclosure, a "secure gateway" is a network security service. In some embodiments, secure gateway may be an on-premise or cloud-delivered service for securing the network. Secure gateway may be implemented to prevent cybersecurity threat such as, without limitation, a web request smuggling vulnerability, wherein the web request smuggling vulnerability is a defect of either a client or server-side device incorrectly interprets web request to cause a malicious query to pass through. In some cases, web request smuggling vulnerability may include, without limitation, CL. TE vulnerability, TE. CL vulnerability, TE. TE vulnerability (i.e., obfuscating TE header), and the like thereof. Secure gateway may be configured to disable HTTP downgrading; for instance, prohibit any HTTP/1 request which is originally a HTTP/2 request. Secure gateway may also be configured to normalize ambiguous web request and reject any web request that are still ambiguous. Additionally, secure gateway may close TCP connection between entities and the server. In some embodiments, a secure gateway may be implemented to prevent SQL injection (SQLi), wherein the SQL injection is a defect that allows data store 128 to execute malicious SQL statements. Malicious SQL statements may retrieve and/or inject content into data store 128 without authentication and authorization from the server. In other non-limiting examples, secure gateway within data store 128 may be configured to validate incoming web request and parameterize SQL queries within request body including prepared statements; for instance, incoming web request may be sanitized, with potential malicious code elements such as, without limitation, single quotes and the like removed. Any web request may never be used and/or interpreted by the server directly.

With continued reference to FIG. 1, additionally, or alternatively, receiving entity data 112 from entity 116 may include filtering entity identification data from entity data 112 using secure gateway. As used in this disclosure, "entity identification data" is data that permits the identity of an entity to whom the data applies to be reasonably inferred by either direct or indirect means. In a non-limiting example, entity identification data may include personal information of entity 116 described above, such as, without limitation, social security number (SSN), user identification number, financial account number, personal address information, phone number, and the like thereof. In some embodiments, filtering entity identification data from entity data 112 may include filtering entity identification data from entity data 112 as a function of security gateway. In a non-limiting example, secure gateway may iterate an entity data collection, wherein the entity data collection may include a plurality of entity data 116 associated with a data description. A plurality of regular expression may be used by secure gateway to identify entity identification data, wherein each regular expression is a sequence of characters that specifies a search pattern in text such as, without limitation, data description. Plurality of regular expression may specify a plurality of search patterns related to entity identification data such as, without limitation, "name," "email," "phone," "SSN," and the like thereof. Secure gateway may then filter entity identification data from entity data 112 by apply plurality of regular expression to entity data 112. In another non-limiting example, secure gateway may include a TCP proxy, wherein a TCP proxy is an intermediary between entity 116 and data store 128; for instance, secure gateway may include a Very Good Security (VGS) TCP proxy which allows filtering out sensitive data such as, without limitation, entity identification data using one or more binary protocols. Binary protocols may include protocols that transform format of data such as, without limitation, entity data 112 into a binary format that can be processed via VGS TCP proxy; for instance, ISO 8583 format. Further, data store 128 may be configured to store filtered entity identification data.

With continued reference to FIG. 1, processor 104 is configured to compare entity data 112 with a cybersecurity metric 132. As used in this disclosure, a "cybersecurity metric" is a measurement of one or more cybersecurity aspects. As used in this disclosure, a "cybersecurity aspect" is a category of cybersecurity. In a non-limiting example, cybersecurity aspects may include, without limitation, critical infrastructure security, application security, network security, cloud security, Internet of Things (loT) security, and the like thereof. In some embodiments, cybersecurity metric 132 may include one or more measurements of security standards. Cybersecurity metric 132 may be manually determined by cybersecurity professionals; for instance, cybersecurity professional may specify a set of cybersecurity standards, cybersecurity metric may include entity data 112 produced by entity 116 following specified cybersecurity standards. Cybersecurity metric 132 may include normal entity data generated by entity 116 or similar entities that follow security practices. As used in this disclosure, "normal entity data" are entity data without any indication of abnormality such as, without limitation, potential cybersecurity risk and/or threats. Indication of abnormality may include abnormal entity data such as, without limitation, entity data obtained from and/or produced through, abnormal entity activities, abnormal device usage, and the like thereof. In some embodiments, cybersecurity metric 132 may include one or more key performance indicators (KPI), wherein the key performance indicator is a type of performance measurement. KPI may evaluate the success of entity 116 in cybersecurity. In a non-limiting example, KPI within cybersecurity metric 132 may include, without limitation, mean time to detect (MTTD), mean time to resolve (MTTR), mean time to contain (MTTC), patching cadence, security rating, number of known vulnerabilities, and the like thereof. In some embodiments, cybersecurity metric may be determined by processor 104. In a non-limiting example, processor 104 may keep track of a first number of known vulnerabilities of internal system of entity 116 at a first time. Processor 104 may be configured to set first number of known vulnerabilities of internal system of entity 116 as cybersecurity metric if these known vulnerabilities are not conflict with normal operation of entity 116. Processor 104 may identify a second number of known vulnerability of internal system of entity 116 at a second time through vulnerability assessment such as, without limitation, system review, vulnerability scanning, and the like thereof.

With continued reference to FIG. 1, in some embodiments, comparing entity data 112 with cybersecurity metric 132 may include identifying at least one cybersecurity threat classification 136 as a function of the comparison. As used in this disclosure, a "cybersecurity threat classification" is a category of cybersecurity threat. Cybersecurity threat classification 136 may include, without limitation, "Phishing," "social engineering," "ransomware," "malware," and the like thereof. In another non-limiting example, cybersecurity threat classification 136 may include exceeded number of AIP request, API requests that does not match the expected structure (cybersecurity metric 132), or the like. In some embodiments, processor 104 may be configured to retrieve cybersecurity threat classification 136 from a data store that stores data or information related to phishing, spam tactics, security threats, cyber-attacks, or the like. As a non-limiting example, cyber-attacks may include a denial-of-service (DDoS) attacks, brute force attempts, injection attacks, or the like. In a non-limiting example, indication of abnormality may include abnormal user account assess; for instance, normal entity data may include a normal user login interval, wherein the normal user login interval is an expected time period between user latest sign out and latest sign in of user's account. In some cases, normal user login interval may be an average user login interval, wherein the average user login interval may be determined as a function of plurality of user sign in timestamps and/or plurality of user sign out timestamps within entity data 112 from the user (i.e., entity 116). Comparing entity data 112 to cybersecurity metric may include comparing a current user login interval with normal user login interval and identifying at least one cybersecurity threat classification 136 based on the comparison. At least one cybersecurity threat classification 136 may be identified by processor 104 as at least one cybersecurity threat classification corresponding to credential theft, if current user login interval is significantly shorter than average user login interval based on the comparison. In another non-limiting example, cybersecurity metric 132 may include normal entity data containing normal network information such as, without limitation, download speed, upload speed, round trip time (RTT), time to first byte (TTFB), network latency, and the like thereof. Entity data 116 may be received through a network latency analysis which contains abnormal network information indicating low download and upload speed (i.e., high network latency) for entity 116. Processor 104 may be configured to compare entity data 112 with cybersecurity metric 132, wherein comparing entity data 112 with cybersecurity metric 132 may include comparing abnormal network information in entity data 112 with normal network information in cybersecurity metric 132 and identifying at least one cybersecurity threat classification 136 such as, without limitation, at least one cybersecurity threat classification corresponding to denial-of-service attack, as a function of the comparison. In some embodiments, processor 104 may identify at least one cybersecurity threat classification using a using a lookup table. A "lookup table," for the purposes of this disclosure, is an array of data that maps input values to output values. A lookup table may be used to replace a runtime computation with an array indexing operation. In another non limiting example, a cybersecurity threat classification lookup table may be able to correlate entity data 112 such as, without limitation, cybersecurity related data 120, entity operation data 124, and the like to at least one cybersecurity threat classification 136. Processor 104 may be configured to "lookup" one or more entity data 112 in order to find at least one corresponding cybersecurity threat classification 136.

With continued reference to FIG. 1, in some embodiments, at least one cybersecurity threat classification 136 may be identified by cybersecurity professionals, as described above; for instance, by reviewing entity data 112, a cybersecurity professional such as, without limitation, a cybersecurity analyst may be able to identify one or more cybersecurity threat classifications 136. In some embodiments, at least one cybersecurity threat classification 136 may be identified using a cybersecurity machine-learning process 140. A "machine-learning process," as used in this disclosure, is a process that automatedly uses a body of data known as training data and/or a training set (described further below in this disclosure) to generate an algorithm that will be performed by processor 104 to produce outputs given data provided as inputs; this is in contrast to a non-machine learning software program where the commands to be executed are determined in advance by a user and written in a programming language. Cybersecurity machine-learning process 140 may utilize supervised, unsupervised, lazy-learning processes and/or neural networks, described further below. Cybersecurity machine-learning process 140 may be trained using cybersecurity training data, wherein the cybersecurity training data may include a plurality of entity data as inputs correlate to a plurality of cybersecurity threat classifications as output. In some cases, plurality of entity data 112 may include a plurality of normalized entity data, wherein normalized entity data are entity data processed by secure gateway described above. In an embodiment, cybersecurity training data may be obtained from data store 128. In another embodiment, cybersecurity training data may include manually labeled data. As a non-limiting example, entity data 112 may be manually collected and labeled by entity 116 and/or cybersecurity professionals described above. Processor 104 may then identify at least one cybersecurity threat classification 136 as a function of trained cybersecurity machine-learning process 140 and entity data 112. In some embodiments, cybersecurity machine-learning process 140 may be used to determine at least one cybersecurity threat classification 136 based on input entity data 112; this may be performed using, without limitation, linear regression model, least squares regression, ridge regression, least absolute shrinkage and selection operator (LASSO) model, multi-task LASSO model, elastic net model, multi-task elastic net model, least angle regression (LAR), LARS LASSO model, orthogonal matching pursuit model, Bayesian regression, logistic regression, stochastic gradient descent model, perceptron model, passive aggressive algorithm. Robustness regression model, Huber regression model, or any other suitable model that may occur to a person skilled in the art upon reviewing the entirety of this disclosure.

With continued reference to FIG. 1, in some embodiments, cybersecurity machine-learning process 140 may include a cybersecurity threat classifier 144. Identifying at least one cybersecurity threat classification 136 may include generating a cybersecurity threat classifier 144 using processor 104. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data, such as user designation training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor 104 may be configured to generate vitality plan classifier 188 using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate vitality plan classifier 188 using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$ where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Cybersecurity threat classifier 144 may classify entity data 112 to at least one cybersecurity threat classification 136. Cybersecurity threat classifier 144 may be trained using training data such as cybersecurity training data described above. Additionally, or alternatively, cybersecurity threat classifier may be configured to output at least one classified cybersecurity threat classification for any processing step described below.

With continued reference to FIG. 1, in some embodiments, at least one cybersecurity threat classification 136 may be identified using fuzzy logic. Cybersecurity machine-learning process 140 described above may be implemented as a fuzzy inferencing system. Fuzzy inferencing system may be described in more detail with reference to FIG. 5. As used in the current disclosure, a "fuzzy inference" is a method that interprets the values in the input vector (i.e., entity data) and, based on a set of rules, assigns values to the output vector (i.e., cybersecurity threat classification). A fuzzy set may also be used to show a degree of match between fuzzy sets may be used to rank one resource against another. For instance, if both entity data 112 and cybersecurity threat classification 136 have fuzzy sets, cybersecurity threat classification 136 may be identified by having a degree of overlap exceeding a predetermined threshold.

With continued reference to FIG. 1, Processor 104 is configured to generate a cybersecurity enhancement program 148 as a function of the comparison. As used in this disclosure, a "cybersecurity enhancement program" is a set of measures, activities, or instructions related to enhancing cybersecurity for entity 116. In a non-limiting example, generating cybersecurity enhancement program 148 may include generating cybersecurity enhancement program 148 as a function of cybersecurity threat classification. In a non-limiting example, cybersecurity enhancement program 148 may include one or more protocols for improving cybersecurity of entity 116 by eliminating cybersecurity threat and/or risk specified by cybersecurity threat classification 136. Eliminating cybersecurity threat and/or risk may include taking certain actions to prevent corresponding cyber-attacks. In some embodiments, cybersecurity enhancement program 148 may include one or more actions that prevent, defense, stop, and/or disrupt one or more cyber-attacks described above. In a non-limiting example, cybersecurity enhancement program 148 may include flagging cybersecurity threat classification 136. For example, and without limitation, processor 104 may transmit the flagged cybersecurity threat classification 136 of entity data 112 to entity device through visual interface. In a non-limiting example, cybersecurity enhancement program 148 may include one or more core information security practices such as, without limitation, performing ongoing security assessments (i.e., cybersecurity assessment) to look for and/or resolve distributed denial-of service attack (DDos) related vulnerabilities, email phishing testing, network monitoring, and the like thereof. Additionally, or alternatively, cybersecurity enhancement program 148 may be determined and/or generated manually by cybersecurity professionals; for instance, without limitation, generating cybersecurity enhancement program 148 may include intaking one or more advise from a cybersecurity professional, such as, without limitation, cybersecurity engineer. Further, cybersecurity enhancement program 148 may be generated by cybersecurity machine-learning process 140 described above in a similar manner to identifying cybersecurity threat classification 136. In a non-limiting example, cybersecurity machine-learning process 140 may include a cybersecurity enhancement program classifier 152. Generating cybersecurity enhancement program 148 may include generating cybersecurity enhancement program classifier 152 using processor 104. Cybersecurity enhancement program classifier 152 may include any classifier described in this disclosure. Cybersecurity enhancement program classifier 152 may be trained using cybersecurity enhancement program training data, wherein cybersecurity enhancement program training data may include a plurality of entity data 112 and cybersecurity threat classifications 136 as input correlated to a plurality of cybersecurity enhancement programs 148 as output. In some cases, cybersecurity enhancement program training data may come from data store 128 or be provided by entity 116 and/or cybersecurity professionals. In some cases, cybersecurity enhancement program training data may include previous outputs such that cybersecurity enhancement program classifier 152 iteratively produces outputs. In other cases, cybersecurity enhancement program training data may include outputs from other machine-learning models such as, without limitation, cybersecurity threat classifier 144 described above. Generating cybersecurity enhancement program 148 may include classifying entity data 112 and at least one cybersecurity threat classification to cybersecurity enhancement program 148 using cybersecurity enhancement program classifier 152. In other embodiments, cybersecurity enhancement program 148 may be determined as a function of cybersecurity threat classification 136; for instance, and without limitation, entity 116 may include entity data 112 containing a phishing issue indicated by a cybersecurity threat classification 136 generated by cybersecurity threat classifier 144 described above, processor 104 may then determine a cybersecurity enhancement program which particularly target on the phishing issue indicated by the cybersecurity threat classification 136 for entity 116. Generating cybersecurity enhancement program 148 may further include outputting cybersecurity enhancement program to entity 116 through visual interface 172 described in further detail below.

With continued reference to FIG. 1, cybersecurity enhancement program 148 may include limited access to data or system for entity 116. As a non-limiting example, entity 116 may include different access level to data or system such as but not limited to API, entity data 112, cybersecurity enhancement program 148, cybersecurity report 168, or the like. In some embodiments, processor 104 may be configured to authenticate entity 116 or entity device using an authentication module. Authentication module may include any suitable software and/or hardware as described in the entirety of this disclosure. Authentication module may include a login portal for entity 116 to submit authentication credentials. Authentication module and/or at least a processor 104 may be configured to receive the authentication credential associated with entity 116 from entity device or visual interface 172, compare the authentication credential to an authorized authentication credential stored within an authentication database, and bypass authentication for entity device based on the comparison of the authentication credential from entity device to the authorized authentication credential stored within data store. A "authentication credential" as described in the entirety of this disclosure, is a datum representing an identity, attribute, code, and/or characteristic specific to an entity or entity device. For example, and without limitation, the authentication credential may include a username and password unique to entity or entity device. The username and password may include any alphanumeric character, letter case, and/or special character. As a further example and without limitation, the authentication credential may include a digital certificate, such as a public key infrastructure (PKI) certificate. As another non-limiting example, authentication credential may include private key, or the like.

With continued reference to FIG. in a non-limiting embodiment, authentication module may manipulate any information or time of information of the entirety of this disclosure to be displayed to an entity with varying authority or accessibility as described above. Authentication module may incorporate priority classifiers used to classify low, average, and high classification of authorized entities. Entities with lower priority classifications detected by authentication module may allow a limited amount of information (limited accessibility) to be displayed to visual interface 172. For example, and without limitation, entities with lower priority classifications may have limited access to API. In another non-limiting embodiment, authentication module may detect entities with high priority classifications and transmit a robust information with full accessibility. Persons of ordinary skill in the art, after viewing the entirety of this disclosure, would appreciate the various amount of information allowed to be viewed for different levels of authority. In a non-limiting embodiment, authentication module may be used as a security measure for information. A person of ordinary skill in the art, after viewing the entirety of this disclosure, would appreciate the function of an authentication module in the context of secure data exchange.

With continued reference to FIG. 1, in some embodiments, cybersecurity enhancement program 148 may include a cybersecurity training course 156 for entity 116. As used in this disclosure, a "cybersecurity training course" is a series of lessons to teach skills and knowledge for cybersecurity. In some embodiments, cybersecurity training course 156 may include a series of lessons that leverage entity's understanding on cybersecurity enhancement program 148. In a non-limiting example, cybersecurity training course 156 may include one or more lessons that teach cybersecurity awareness to entity 116. Additionally, cybersecurity training course 156 may use behavioral science technique to fundamentally transform cybersecurity awareness of entity 116. In some embodiments, cybersecurity training course 156 may include various course formats such as, without limitation, video, audio, text document, slide presentation, and the like. In some embodiments, cybersecurity training course may include a course schedule. "Course schedule," as described herein, is a time schedule for attending cybersecurity training course 156. In some cases, course schedule may include a course timing, wherein the course timing is when entity 116 attend cybersecurity training course. In a non-limiting example, course timing may include a specific time and/or date cybersecurity training course 156 is available for entity 116. In some cases, course schedule may include a course frequency, wherein the course frequency is a rate of entity 116 attends cybersecurity training course 156. In a non-limiting example, entity 116 may attend cybersecurity training course 156 daily, weekly, bi-weekly, monthly, yearly, or the like thereof. In some cases, course schedule may include a course sequence, wherein the course sequence is an order of entity 116 attends cybersecurity training course. In a non-limiting example, a first cybersecurity training course may be a prerequisite course for a second cybersecurity training course. In other case, course schedule may include a course duration, wherein the course duration is a length of cybersecurity training course 156. In a non-limiting example, a cybersecurity training course 156 may include a course duration of 50 minutes. Cybersecurity training course 156 may include five lessons, each of which may be 10 minutes in length.

With continued reference to FIG. 1, cybersecurity enhancement program 148 may include one or more computer programs such as, without limitation, sequence or set of instructions in a computer readable language that can be executed by entity 116. In some cases, computer programs may include, without limitation, scripts, plugins, packages, tools, software, and the like thereof. One or more computer programs within cybersecurity enhancement program 148 may include computer programs configured to enhance cybersecurity of entity 116. In a non-limiting example, computer programs may include one or more computer programs configured to reduce and/or mitigate cybersecurity risk exposed and/or hidden in entity 116 such as, without limitation, cybersecurity risk management tools. In another non-limiting example, computer programs may include one or more computer programs configured to leverage security level of entity 116 such as without limitation, firewall, encryption tools, public key infrastructure (PKI) services, network defense tools, web protection software, and the like thereof. In other non-limiting example, computer programs may include one or more computer programs configured to prevent potential cybersecurity threats such as, without limitation, network security monitoring tools, web vulnerability scanning tools, managed detection services, and the like thereof. Persons skilled in the art, upon reviewing the entirety of this disclosure, will be aware of the various embodiments of computer programs used for enhancing cybersecurity as described herein. In a non-limiting example, cybersecurity enhancement program 148 may include a dark web scanning, wherein the dark web scanning is a program that searches the dark web for data related to entity 116. In some cases, data may include, without limitation, credit card and debit card account numbers, log-in credentials, driver's licenses, social security numbers, medical records, contact information of entity 116 and the like thereof. As used in this disclosure, a "dark web" is a network of sites that entity 116 cannot access through typical search engine. Sites and/or portions thereof that are on the dark web may use encryption software to hide their locations, set a robots.txt or other setting instructing search engines to ignore them, use file formats that are resistant to searches, and/or otherwise intentionally or unintentionally make themselves "invisible" or difficult to locate for search engines, web crawlers, and the like. Cybersecurity enhancement program 148 may include a dark web scanning configured to search the dark web and its database of stolen usernames, passwords, social security numbers, credit card numbers for sale. In another non-limiting example, cybersecurity enhancement program 148 may include a dark web monitoring, wherein the dark web monitoring is a continued dark web scan described above. In other non-limiting examples, cybersecurity enhancement program 148 may include tools or computer programs from third-party vendors such as, without limitation, MYGLUE, DASHLANE, IT POLICES, N-ABLE, DATTO RMM, BULLPHISH, CURRICULA, GAPHUS, SPANNING, DARKWEB ID, BITDEFENDER, and the like thereof. Additionally, or alternatively, cybersecurity enhancement program 148 may further include instructions for installing, operating, and/or uninstalling one or more computer programs described above. Further, cybersecurity enhancement program 148 includes a cyber-attack simulation 160. As used in this disclosure, a "cyber-attack simulation" is offensive testing on the cybersecurity of entity 116. In some embodiments, cyber-attack simulation 160 may include entity 116 and/or cybersecurity professionals emulating one or more cyber-attacks against entity 116 and/or entity data 112. Cyber-attacks may be determined and/or configured based on cybersecurity enhancement program 148 and/or cybersecurity threat classification 136. In a non-limiting example, cyber-attack simulation may include a cybersecurity engineer initiating a plurality of actual hacks (i.e., cyber-attacks) against network, infrastructure, assets, data and/or the like of entity 116 using tactics and procedures (TTPs) of known cyber criminals. Cyber-attack simulation 160 may be described in further detail below.

With continued reference to FIG. 1, processor 104 is configured to implement cybersecurity enhancement program 148 for entity 116 based on entity data 112. As used in this disclosure, "implementing" means practicing, performing, or otherwise executing cybersecurity enhancement program 148 for entity 116. In some embodiments, implementing cybersecurity enhancement program 148 may include requiring entity 116 to follow one or more security practices determined based on business structure, process, and/or model of entity 116; for instance, without limitation, entity 116 may be required to meet certain regulation requirement such as, without limitation, PCI, HIPAA, GDPR, FINRA, and the like by following provided IT security policies such as, without limitation, IT guidelines, IT expectations, IT repercussions, and the like thereof. In some embodiments, implementing cybersecurity enhancement program 148 may include setting up course schedule for one or more cybersecurity training courses 156 for entity 116 based on entity data 112; for instance, without limitation, course schedule may be created based on personal information such as, without limitation, a personal schedule within entity data 112. In some embodiments, implementing cybersecurity enhancement program 148 may include installing certain computer programs described above; for instance, without limitation, installing encryption tool for data communication encryption within network of entity 116. Installing computer programs may further include operating computer programs upon successful installation; continuing the example, encrypting network packet using installed encryption tool. Encryption tool may include cryptographic system described above in this disclosure. In some embodiments, processor 104 may be configured to encrypt or decrypt any data or information disclosed in this disclosure, such as but not limited to entity data 112, cybersecurity threat classification 136, cybersecurity enhancement program 148, cybersecurity report 168, entity prompt 176, prompt response 188, or the like. In some embodiments, implementing cybersecurity enhancement program 148 may include managing entity 116. In a non-limiting example, implementing cybersecurity enhancement program 148 may include scheduling meetings monthly between cybersecurity professionals and entity 116 to make sure entity 116 understand cybersecurity enhancement program 148, and is using tools within cybersecurity enhancement program 148. Meetings may include answering questions and/or addressing concerns from entity 116.

With continued reference to FIG. 1, additionally, or alternatively, implementing the cybersecurity enhancement program 148 may include performing cyber-attack simulation 160 using a cyber-attack simulation module 164. As used in this disclosure, a "cyber-attack simulation module" is a component containing executable instructions for conducting cyber-attack simulation 160. In a non-limiting example, cyber-attack simulation 160 may include a penetration testing. As used in this disclosure, a "penetration testing" is an authorized simulated cyber-attack on entity 116. Cyber-attack simulation module 164 may be configured to perform penetration testing on entity 116 to evaluate cybersecurity of entity 116. In some embodiments, penetration testing may be configured to identity weaknesses (i.e., vulnerabilities); for instance, and without limitation, weakness may include a potential for unauthorized parties to gain access to entity 116. In other embodiments, penetration testing may be configured to identify strengths; for instance, and without limitation, strengths may include strength preventing unauthorized parties to gain access to entity 116. In some cases, penetration testing may include a standard framework such as, without limitation, Open-Source Security Testing Methodology Manual (OSSTMM), Penetration Testing Execution Standard (PTES), Information System Security Assessment Framework (ISSAF), and the like thereof. In some embodiments, entity 116 may be a white box during cyber-attack simulation 160, wherein the white box is an entity which background and system information are provided in advance to cyber-attack simulation module 164. In other embodiments, entity 116 may be a black box during cyber-attack simulation 160, wherein the black box is an entity which limited knowledge of the entity is shared with cyber-attack simulation module 164.

With continued reference to FIG. 1, in some embodiments, cyber-attack simulation may include automated phishing simulation. "Phishing simulation," as described herein, is a test which entity 116 and/or cybersecurity professionals distribute malicious data such as, without limitation, deceptive messages, malicious emails, and the like within network of entity 116. In some cases, malicious data may not cause actual damage/loss to entity 116 and/or entity data 112. In other cases, malicious data may cause actual damage/loss to entity 116 and/or entity data 112. Damage or loss may include, but not limited to, physical, mental, financial, computational damage or loss and the like thereof. In a non-limiting example, organization (i.e., entity 116) may send a plurality of malicious emails to a plurality of employees to gauge the plurality of employees' response to the plurality of malicious emails. In some embodiments, cyber-attack simulation module may be configured to automatically generate malicious data and/or send malicious data to entity 116 at a predetermined time or throughout a predetermined time period. Continuing the example, cyber-attack simulation module 164 may be configured to automatically generate malicious emails and send malicious emails to entity 116 monthly at a random time using a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module, and diagnostic engine may then use such associations to analyze words extracted from one or more documents and determine that the one or more documents indicate significance of a category. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, in other embodiments, without limitation, cyber-attack simulation may include automated man-in-the-middle (MitM) attack simulation. As used in this disclosure, a "man-in-the-middle attack simulation" is a test of an eavesdropping attack, wherein the eavesdropping attack interrupts an existing conversation or data transfer between two or more entities. In some embodiments, cyber-attack simulation module 164 may be configured to perform automated MitM simulation by inserting a dumb agent in the middle of the data transfer (i.e., entities communication), wherein the dumb agent is an agent program configured to receive data from all parties within the conversation. For instance, without limitation, instead of send entity data 112 to another entity such as a server, entity 116 may send entity data 112 to the dumb agent. Sever may then receive entity data 112 from dumb agent instead of entity 116. In some embodiments, dumb agent may do nothing to the transferred data. In other embodiments, dumb agent may process the transferred data; for instance, and without limitation, injecting a harmless token to the transferred data. In a non-limiting example, cyber-attack simulation module 164 may install a packet sniffer to analyze network traffic for insecure communication between a first entity and a second entity. A dumb agent may be deployed by cyber-attack simulation module 164 to mimic first entity or second entity wherein the dumb agent may be configured to receive entity data packet from first entity and insert one or more harmless token to entity data packet.

With continued reference to FIG. 1, cyber-attack simulation module 164 may be configured to receive a plurality of responses to malicious data from entity 116 and analyze the plurality of responses to malicious data. In some embodiments, response to malicious data may include at least a change of entity data 112. In some cases, response to malicious data may be generated by, logging keystrokes, taking screenshots, installing adware, stealing credentials, creating backdoors, altering data, and/or the like thereof. In a non-limiting example, at least a change of entity data 112 may include one or more harmless tokens inserted by dumb agent during MitM attack simulation described above that are not part of the original entity data 112. In a non-limiting example, cyber-attack simulation module 164 may initiate a cyber-attack such as, without limitation, a malware attack. Cyber-attack simulation module 164 may be configured to send malicious data containing a pre-programed dumb malware to entity 116, wherein the "pre-programed dumb malware" is a malware configured to cause no actual harm to entity 116. Malicious data may contain social engineering to induce entity 116 to process malicious data. In some cases, at least a change of entity data 112 may include entity 116 removing malicious data containing pre-programed dumb malware. In other cases, at least a change of entity data 112 may include entity 116 processing malicious data, wherein processing malicious data may include installing pre-programed dumb malware within processed malicious data. In some embodiments, performing the cyber-attack simulation 160 may include generating a cybersecurity report 168 as a function of cyber-attack simulation. As used in this disclosure, a "cybersecurity report" is a set of critical information about cybersecurity of entity 116. In some embodiments, cybersecurity report 168 may include, without limitation, representations of entity data 112, cybersecurity threat classification 136, cybersecurity enhancement program 148, and the like thereof. In some cases, cybersecurity report 168 may include data such as, without limitation, number of updates downloaded, number of cybersecurity training course completed, number of phishing emails blocked before reaching entity 116, and the like thereof. In a non-limiting example, cybersecurity report 168 may be generated as a function of at least a change of entity data 112. Cyber-attack simulation module 164 may include a simulation statistical model configured to perform statistical analysis such as, without limitation, data collection, descriptive statistical analysis, inferential statistical analysis, associational statistical analysis, predictive analysis, prescriptive analysis, exploratory data analysis, causal analysis, and the like to plurality of responses to malicious data. Statistical analysis may be performed through one or more statistical analysis process such as, without limitation, data collection, data organization, data presentation, data analysis, data interpretation, and the like. Statistical analysis may be performed using one or more statistical analysis method, such as, without limitation, sum, mean, standard deviation, regression, hypothesis testing and the like thereof. Person skilled in the art would recognize various statistical analysis, statistical analysis process, and statistical analysis method described herein upon review of the entirety of this disclosure. In a non-limiting example, without limitation, simulation statistical model may generate cybersecurity report 168 as a function of at least a change to entity data 112; for instance, simulation statistical model may collect all responses to malicious data containing at least a change to entity data 112, wherein the at least a change to entity data 112 may include entity 116 removing malicious data, and collect all responses to malicious data containing at least a change to entity data 112, wherein the at least a change to entity data 112 may include entity 116 processing malicious data. Generating cybersecurity report may include comparing two collections of responses to malicious data; for instance, and without limitation, cybersecurity report 168 may display number or responses in both collections, and protocols within cybersecurity enhancement program 148 that configured to increase the number of responses from entity 116 that removes malicious data and decrease the number of responses from entity 116 that process malicious data. Additionally, or alternatively, implementing cybersecurity enhancement program 148 may include updating the cybersecurity enhancement program 148 as a function of the cybersecurity report. In a non-limiting example, statistical data within cybersecurity report generated by cyber-attack simulation module, particularly simulation statistical model, may be received as new entity data 112. A new cybersecurity enhancement plan may be generated and implemented based on new entity data using similar processing steps described above. New cybersecurity enhancement plan may focus on eliminating outliers introduced within cybersecurity report 168.

With continued reference to FIG. 1, in some embodiments, cybersecurity report 168 may be displayed graphically through a visual interface 172. As used in this disclosure, a "visual interface" is a form of interface that is visible to entity 116 and allows entity 116 to interact with apparatus 100. In some embodiments, visual interface 172 may be provided through an entity device. As used in this disclosure, an "entity device" for the purpose of this disclosure, is any additional computing device, such as a mobile device, laptop, desktop computer, or the like. In a non-limiting example, entity device may be a computer and/or smart phone operated by an entity (i.e., user) in a remote location. Entity device may include, without limitation, a display, wherein the display may include any display as described in the entirety of this disclosure such as a light emitting diode (LED) screen, liquid crystal display (LCD), organic LED, cathode ray tube (CRT), touch screen, or any combination thereof. In a non-limiting example, entity device may include a display configured to display visual interface 112 from apparatus 100 and/or computing device as a graphical user interface (GUI) that may provide high digital engagement between entities and/or devices. In other non-limiting examples, visual interface may include a web portal, application portal, messaging service, and/or other forms of visual interface used for communication. In some embodiments, cybersecurity report 168 may include one or more graphs illustrating data such as, without limitation, plurality of responses to malicious data, at least a change to entity data 112, and the like extracted, processed, and/or analyzed by cyber-attack simulation module, particularly simulation statistical model. In some cases, graphs may include bar graphs, box plots, histograms, pie charts, scatter plots, and the like thereof. In some embodiments, entity 116 may interact with cybersecurity report 168; for instance, without limitation, entity 116 may be able to change graph types through visual interface 172. For another example, without limitation, entity 116 may be able to show and/or hide data such as, entity data 112, cybersecurity threat classification 136, cybersecurity metric 132, cybersecurity enhancement program 148, plurality of responses to malicious data, at least a change to entity data 112, and the like thereof. persons skilled in the art, upon reviewing the entirety of this disclosure, will be aware of various graphs that may be used within cybersecurity report displayed through visual interface.

With continued reference to FIG. 1, processor 104 is configured to receive an entity prompt 176 from an entity. For the purposes of this disclosure, an "entity prompt" is a data input or command provided by an entity to a computer system, software application, or interface. As a non-limiting example, entity may input entity prompt 176 using in visual interface of entity device, chatbot 180 operating on or communicating with entity device, or the like. For the purposes of this disclosure, "chatbot" is an artificial intelligence (AI) program designed to simulate human conversation or interaction through text, voice-based or image-based communication. In some embodiments, entity prompt 176 may include a directive or query expressed in natural language, code, or any other format. In some embodiments, entity prompt 176 may include text, audio, gestures, button clicks, image, video, or the like. In some embodiments, entity prompt 176 may instruct or request apparatus 100 or processor 104 to perform a specific action, provide information, or engage in a dialogue with user. As a non-limiting example, entity prompt 176 may include a request to implement cyber-attack simulation 160, generate cybersecurity enhancement program 148, determine cybersecurity threat classification 136, or the like. As another non-limiting example, entity prompt 176 may include a request to review entity data 112. In some embodiments, processor 104 may store entity prompt 176 in data store 128. In some embodiments, processor 104 may entity prompt 176 from data store 128.

With continued reference to FIG. 1, in some embodiments, processor 104 may be configured to analyze entity prompt 176 to find a prompt context of entity prompt 176. In some embodiments, language processing module 184 may be configured to analyze entity prompt 176 to identify a prompt context. For the purposes of this disclosure, a "prompt context" is information of an entity prompt that helps to provide better understanding of its meanings, details, or circumstances. As a non-limiting example, prompt context may include a keyword of entity prompt 176. For example, and without limitation, if entity prompt 176 includes 'find a phishing email,' then prompt context may include keywords such as but not limited to 'email,' 'phishing,' 'email phishing,' or the like. For another example, and without limitation, prompt context may include time-related details, location-related information, or the like. As another non-limiting example, prompt context may include any features of entity prompt 176. In some embodiments, entity prompt 176 may be stored in data store 128. In some embodiments, entity prompt 176 may be retrieved from data store 128.

With continued reference to FIG. 1, in some embodiments, processor 104 may be configured to generate context training data. For the purposes of this disclosure, "context training data" is training data that trains a context language processing model. Context language processing model disclosed herein is further described below. In some embodiments, context training data may include correlations between exemplary entity prompts and exemplary prompt contexts. As a non-limiting example, context training data may include correlations between entity prompt 176 that includes a request to find an email phishing, then prompt context may include keywords such as but not limited to 'email,' 'phishing,' 'email phishing.' In some embodiments, context training data may be consistent with any training data described in the entirety of this disclosure. In some embodiments, context training data may be received from one or more users, data store 128, external computing devices, and/or previous iterations of processing. As a non-limiting example, context training data may include instructions from a user, who may be an expert user, a past user in embodiments disclosed herein, or the like, which may be stored in memory and/or stored in data store 128, where the instructions may include labeling of training examples. In some embodiments, context training data may be updated iteratively through a feedback loop. As a non-limiting example, context training data may be updated iteratively through a feedback loop as a function of newly collected entity prompt 176, prompt contexts, or the like.

With continued reference to FIG. 1, in some embodiments, language processing module 184 may be configured to identify prompt context of entity prompt 176. In some embodiments, language processing module 184 or processor 104 may be configured to train a context language processing model using context training data. For the purposes of this disclosure, a "context language processing model" is a type of natural language processing (NLP) model or system specifically designed to analyze and understand the contextual aspects of language and data. In some embodiments, language processing module 184 may be configured to identify prompt context of entity prompt 176 using the trained context language processing model. As a non-limiting example, context language processing model that is trained with context training data may identify keyword or feature of entity prompt 176. In some embodiments, inputs and/or outputs of context language processing model may be stored in data store 128. In some embodiments, inputs and/or outputs of context language processing model may be retrieved from data store 128.

With continued reference to FIG. 1, in some embodiments, processor 104 may be configured to generate a security score of entity 116. For the purposes of this disclosure, a "security score" is a value representing an evaluation of cyber-security of entity. In an embodiment, security score may be a quantitative characteristic, such as a numerical value within a set range. As a non-limiting example, security score may be a '2' for a score range of 0-10, where '0' may represent a entity 116 having a minimum and/or no cyber-security threats and '10' represents entity 116 having maximum cybersecurity threats. In other non-limiting embodiments, security score may be a quality characteristic, such as a color coding, where each color is associated with a level of cybersecurity threats. As a non-limiting example, security score may be red, where green may represent a minimum and/or no cybersecurity threats. As another non-limiting example, security score may be green, where red may represent a lot of cybersecurity threats. As another non-limiting example, security score may be light grey when there is no cybersecurity threats and the color may get darker as a number of the cybersecurity threats increases. In some embodiments, security score may include low to high scoring. As a non-limiting example, security score may be 'low' when there is minimum and/or no cybersecurity threats and security score may be 'high' when there is a lot of cybersecurity threats. In some embodiments, security score may be updated in real-time as the at least a processor 104 receives new entity data 112.

With continued reference to FIG. 1, in some embodiments, processor 104 may be configured to generate a security score of entity 116 as a function of cybersecurity threat classification 136, cybersecurity simulation 164, cybersecurity report 168, cybersecurity enhancement program 148, or the like. As a non-limiting example, processor 104 may be configured to generate security score as a function of number of cybersecurity threats identified from entity data 112 of entity 116. As another non-limiting example, processor 104 may be configured to generate security score as a function of each of cyber-attack simulation 160 implemented as a function of entity prompt 1767.

In some embodiments, security score may be manually determined by human or using scoring algorithms or a score machine-learning model that is trained in score training data that correlates between exemplary entity data 112 and exemplary security scores. In some embodiments, processor 104 may be configured to transmit security score through visual interface 172.

With continued reference to FIG. 1, processor 104 is configured to generate cybersecurity enhancement program 148 as a function of entity prompt 176. In some embodiments, processor 104 may generate cybersecurity enhancement program 148 or implement cybersecurity enhancement program classifier 152 as entity prompt 176 includes a request or prompt related to generating cybersecurity enhancement program 148 for entity data 112. In some embodiments, processor 104 may determine cybersecurity threat classification 136 or implement cybersecurity threat classifier 144 as entity prompt 176 includes a request or prompt related to determining cybersecurity threat classification 136 for entity data 112 or generating cybersecurity enhancement program 148 for entity data 112.

With continued reference to FIG. 1, processor 104 is configured to generate prompt response 188 as a function of at least a change in entity data 112. In some cases, at least a change of entity data 112 may include entity 116 removing malicious data containing pre-programmed dumb malware. In other cases, at least a change of entity data 112 may include entity 116 processing malicious data, wherein processing malicious data may include installing pre-programed dumb malware within processed malicious data. In some embodiments, at least a change of entity data 112 may include any change of entity data 112 resulted by implementing cybersecurity enhancement program 148 for entity data 112 or simulation of cyber-attack for entity data 112. In some embodiments, processor 104 may be configured to detect at least a change in entity data 112 by comparing entity data 112 to cybersecurity metric 132 as described in this disclosure or using cyber-attack simulation module 164. For the purposes of this disclosure, a "prompt response" is information, answer, or output generated in reply to an entity prompt. In some embodiments, prompt response 188 may include text, audio, code, or the like. In some embodiments, prompt response 188 may include an answer to a question, question to retrieve more information, search result, recommendations, suggestions, information display, confirmation, completion, execution of a request, or the like. Prompt response 188 includes cybersecurity report 168. As a non-limiting example, prompt response 188 may include number of updates downloaded, number of cybersecurity training courses completed, number of phishing emails blocked before reaching entity 116, and the like thereof. In a non-limiting example, prompt response 188 may include statistical analysis, such as, without limitation, data collection, descriptive statistical analysis, inferential statistical analysis, associational statistical analysis, predictive analysis, prescriptive analysis, exploratory data analysis, causal analysis, or the like of entity data 112, at least a change of entity data, or malicious data of entity data 112. In some embodiments, prompt response 188 may be stored in data store 128. In some embodiments, in prompt response 188 may be retrieved from data store 128. Processor 104 is configured to display prompt response 188 through visual interface 172 of entity device of entity 116. In some embodiments, processor 104 may transmit prompt response 188 through chatbot 180, visual interface 172 of remote device, or the like.

With continued reference to FIG. 1, in some embodiments, processor 104 may be configured to generate a prompt response 188 using a language processing module 184. In some embodiments, language processing module 184 may generate prompt response 188 as a function of an output of cyber-attack simulation module 164, output of cybersecurity enhancement program classifier 152, output of cybersecurity threat classifier 144, or the like. In some embodiments, language processing module 184 or training data of language processing module 184 may be iteratively updated through a feedback loop as a function of newly collected entity prompt 176, entity data 112, output of cyber-attack simulation module 164, output of cybersecurity enhancement program classifier 152, output of cybersecurity threat classifier 144, or the like. In some embodiments, language processing module 184 may include a generative machine learning process. As used in this disclosure, a "generative machine learning process" is a process that automatedly, using a prompt (i.e., input), generates an output consistent with training data; this is in contrast to a non-machine learning software program where outputs are determined in advance by a user and written in a programming language. In some embodiments, generative machine-learning processes may determine patterns and structures from training data and use these patterns and structures to synthesize new data with similar characteristics, as a function of an input. As a non-limiting example, generative machine-learning process may determine patterns and structures from training data of language processing models, or any machine-learning models described in the entirety of this disclosure and may use these patterns to synthesize new data, prompt response 188, or the like as a function of an input, such as but not limited to entity data 112, entity prompt 176, or the like.

With continued reference to FIG. 1 generative machine learning processes may synthesize data of different types or domains, including without limitation text, code, images, molecules, audio (e.g., music), video, and robot actions (e.g., electromechanical system actions). Exemplary generative machine learning systems trained on words or word tokens, operant in text domain, include GPT-3, LaMDA, LLaMA, BLOOM, GPT-4, and the like. Exemplary machine learning processes trained on programming language text (i.e., code) include without limitation OpenAI Codex. Exemplary machine learning processes trained on sets of images (for instance with text captions) include Imagen, DALL-E, Midjourney, Adobe Firefly, Stable Diffusion, and the like; image generative machine learning processes, in some cases, may be trained for text-to-image generation and/or neural style transfer. Exemplary generative machine learning processes trained on molecular data include, without limitation, AlphaFold, which may be used for protein structure prediction and drug discovery. Generative machine learning processes trained on audio training data include MusicLM which may be trained on audio waveforms of music correlated with text annotations; music generative machine learning processes, in some cases, may generate new musical samples based on text descriptions. Exemplary generative machine learning processes trained on video include without limitation RunwayML and Make-A-Video by Meta Platforms. Finally, exemplary generative machine learning processes trained using robotic action data include without limitation UniPi from Google Research.

With continued reference to FIG. 1, in some cases a generative machine learning process may include a generative adversarial network (GAN). As used in this disclosure, a "generative adversarial network" is a machine learning process that includes at least two adverse networks configured to synthesize data according to prescribed rules (e.g., rules of a game). In some cases, a generative adversarial network may include a generative and a discriminative network, where the generative network generates candidate data and the discriminative network evaluates the candidate data. An exemplary GAN may be described according to a following game: Each probability space $(\Omega, \mu_{ref})$ defines a GAN game. There are two adverse networks: a generator network and a discriminator network. Generator network strategy set is $P(\Omega)$, the set of all probability measures $\mu_G$ on $\Omega$. Discriminator network strategy set is the set of Markov kernels $\mu_D: \Omega \to P[0,1]$, where $P[0,1]$ is set of probability measures on $[0,1]$. GAN game may be a zero-sum game, with objective function:

$$L(\mu_G, \mu_D) := \mathbb{E}_{x \sim \mu_{ref}, y \sim \mu_D(x)}[\ln y] + \mathbb{E}_{x \sim \mu_G, y \sim \mu_D(x)}[\ln(1-y)].$$

Generally, generator network may aim to minimize objective, and discriminator network may aim to maximize the objective. Specifically, generator network seeks to approach $\mu_G \approx \mu_{ref}$, said another way, generator network produces candidate data that matches its own output distribution as closely as possible to a reference distribution (provided with training data). Discriminator network outputs a value close to 1 when candidate data appears to be from reference (training data) distribution, and to output a value close to 0 when candidate data looks like it came from generator network distribution. Generally speaking, generative network generates candidates while discriminative network evaluates them, with contest operating in terms of data distributions. In some embodiments, generator network may learn to map from a latent space to a data distribution of interest, while discriminator network may distinguish candidates produced by the generator network from a true data distribution (e.g., training data). In some cases, generator network's training objective is to increase an error rate of discriminator network (i.e., "fool" the discriminator network by producing novel candidates that the discriminator thinks are not synthesized but, instead, are part of training data). In some cases, a known dataset may serve as initial training data for discriminator network. Training may involve presenting discriminator network with samples from training dataset until it achieves acceptable accuracy. In some cases, generator network may be trained on whether the generator network succeeds in fooling discriminator network. A generator network may be seeded with randomized input that is sampled from a predefined latent space (e.g. a multivariate normal distribution). Thereafter, candidates synthesized by generator network may be evaluated by discriminator network. Independent backpropagation procedures may be applied to both networks so that generator network may produce better samples, while discriminator network may become more skilled at flagging synthetic samples. When used for image generation, generator network may be a deconvolutional neural network, and discriminator may be a convolutional neural network.

With continued reference to FIG. 1, in some embodiments, generative AI may include large language model (LLM). A "large language model," as used herein, is a deep learning algorithm that can recognize, summarize, translate, predict and/or generate text and other content based on knowledge gained from massive datasets. LLMs may be trained on large sets of data; for example, training sets may include greater than 1 million words. Training sets may be drawn from diverse sets of data such as, as non-limiting examples, novels, blog posts, articles, emails, and the like.

Training sets may include a variety of subject matters, such as, as nonlimiting examples, medical tests, romantic ballads, beat poetry, emails, advertising documents, newspaper articles, and the like. LLMs, in some embodiments, may include GPT, GPT-2, GPT-3, and other language processing models. LLM may be used to augment the text in an article based on a prompt. Training data may correlate elements of a dictionary related to linguistics, as described above, to a prompt. LLM may include a text prediction based algorithm configured to receive an article and apply a probability distribution to the words already typed in a sentence to work out the most likely word to come next in augmented articles. For example, if the words already typed are "Nice to meet", then it is highly likely that the word "you" will come next. LLM may output such predictions by ranking words by likelihood or a prompt parameter. For the example given above, the LLM may score "you" as the most likely, "your" as the next most likely, "his" or "her" next, and the like.

Still referring to FIG. 1, LLM may include an attention mechanism, utilizing a transformer as described further below. An "attention mechanism," as used herein, is a part of a neural architecture that enables a system to dynamically highlight relevant features of the input data. In natural language processing this may be a sequence of textual elements. It may be applied directly to the raw input or to its higher-level representation. An attention mechanism may be an improvement to the limitation of the Encoder-Decoder model which encodes the input sequence to one fixed length vector from which to decode the output at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation. In some embodiments, LLM may include encoder-decoder model incorporating an attention mechanism.

Still referring to FIG. 1, LLM may include a transformer architecture. In some embodiments, encoder component of LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation.

Still referring to FIG. 1, an attention mechanism may include generalized attention self-attention, multi-head attention, additive attention, global attention, and the like. In generalized attention, when a sequence of words or an image is fed to LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM may pick up particular parts at different positions in the input sequence and over time compute an initial composition of the output sequence. In multi-head attention, LLM may include a transformer model of an attention mechanism. Attention mechanisms, as described above, may provide context for any position in the input sequence. For example, if the input data is a natural language sentence, the transformer does not have to process one word at a time. In multi-head attention, computations by LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM may learn to associate the word "you", with "how" and "are". It's also possible that LLM learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiplies using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am", decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filed with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the SoftMax of this matrix is taken, the negative infinities will be zeroed out; this leaves "zero" attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classes will be of size 10,000. The output of this classifier may be fed into a SoftMax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token. In some embodiment, decoder may be stacked N layers high, with each layer taking in inputs from the encoder and layers before it. Stacking layers may allow LLM to learn to extract and focus on different combinations of attention from its attention heads.

Figure 2:
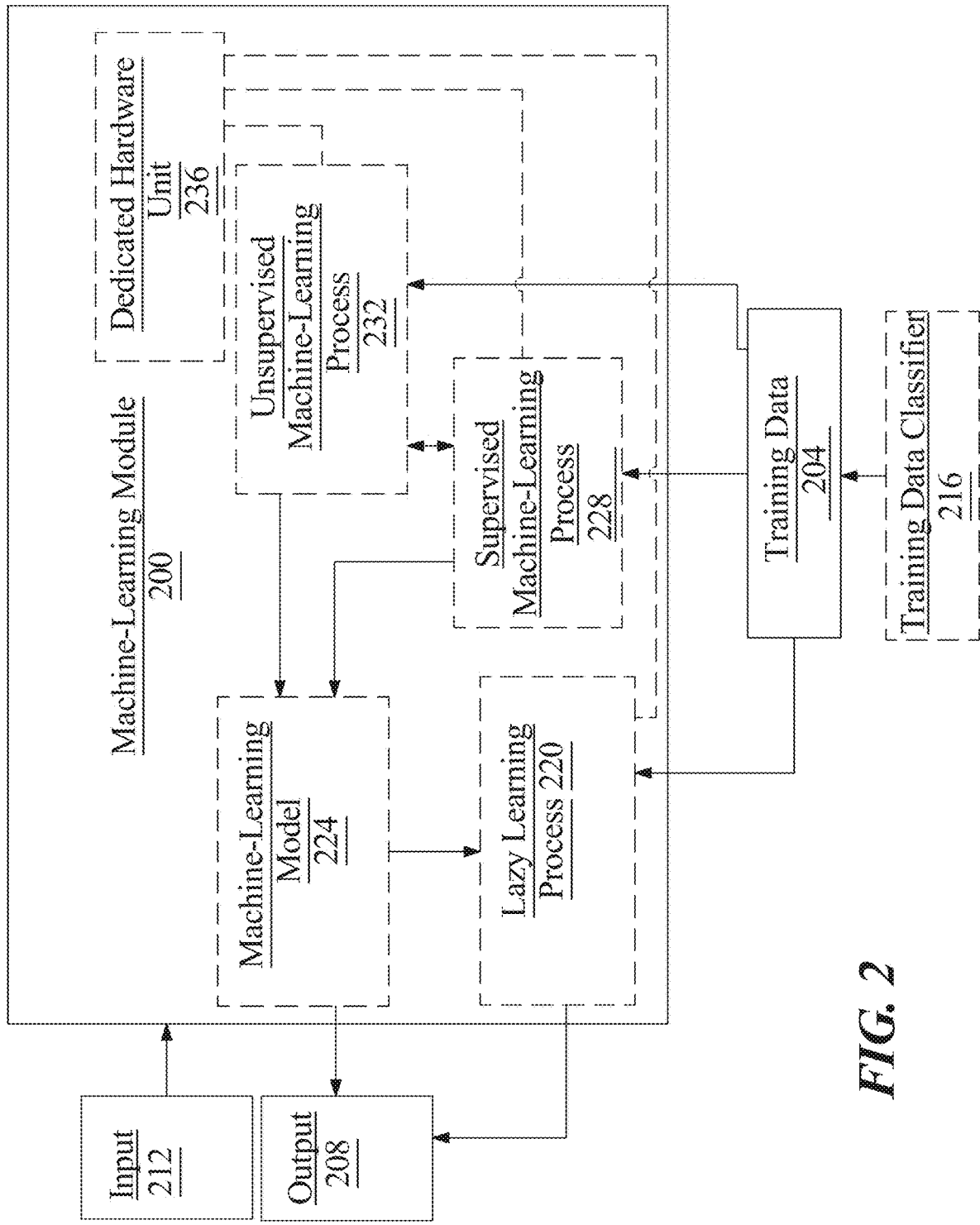
FIG. 2 illustrates a block diagram of an exemplary embodiment of a machine-learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, input data may include entity data 112, entity prompt 176, cybersecurity threat classification 136, cybersecurity enhancement program 148, or the like. As a non-limiting example, output data may include prompt response 188, cybersecurity enhancement program 148, cybersecurity report 168, cybersecurity threat classification 136, or the like.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to a cohort of entity data 112 or entity 116, such as but not limited to different teams, industries, sizes, locations, or the like.

Still referring to FIG. 2, computing device 204 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 204 may then calculate a likelihood table by calculating probabilities of different data entries and classification labels. Computing device 204 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 2, computing device 204 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l = \sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 2, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 2, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 2, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 2, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include entity data 112, entity prompt 176, cybersecurity threat classification 136, cybersecurity enhancement program 148 as inputs and prompt response 188, cybersecurity enhancement program 148, cybersecurity report 168, cybersecurity threat classification 136 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods.

Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
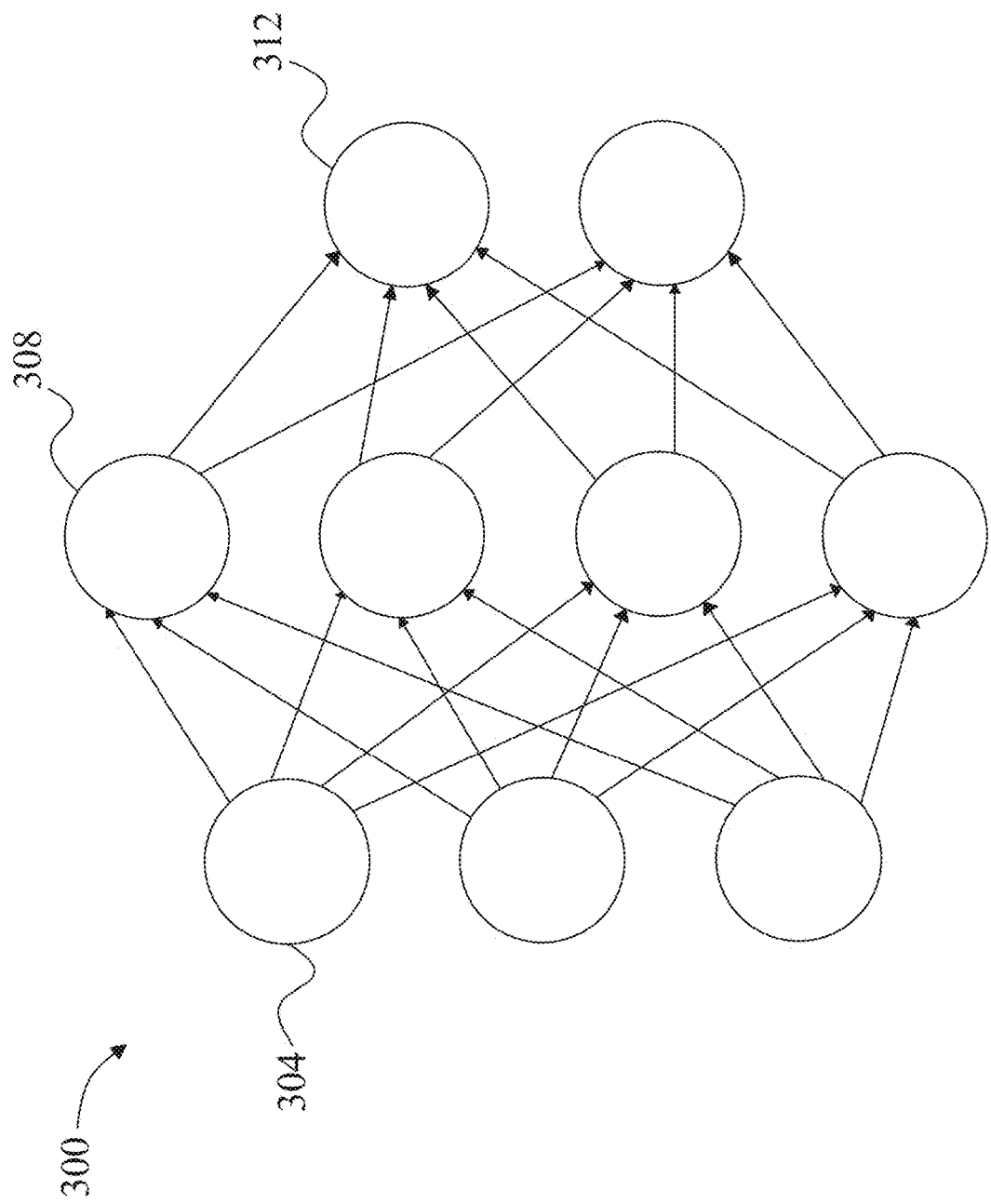
FIG. 3 illustrates a block diagram illustrating an exemplary embodiment of a neural network.

Referring now to FIG. 3, an exemplary embodiment of neural network 300 is illustrated. A neural network 300, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
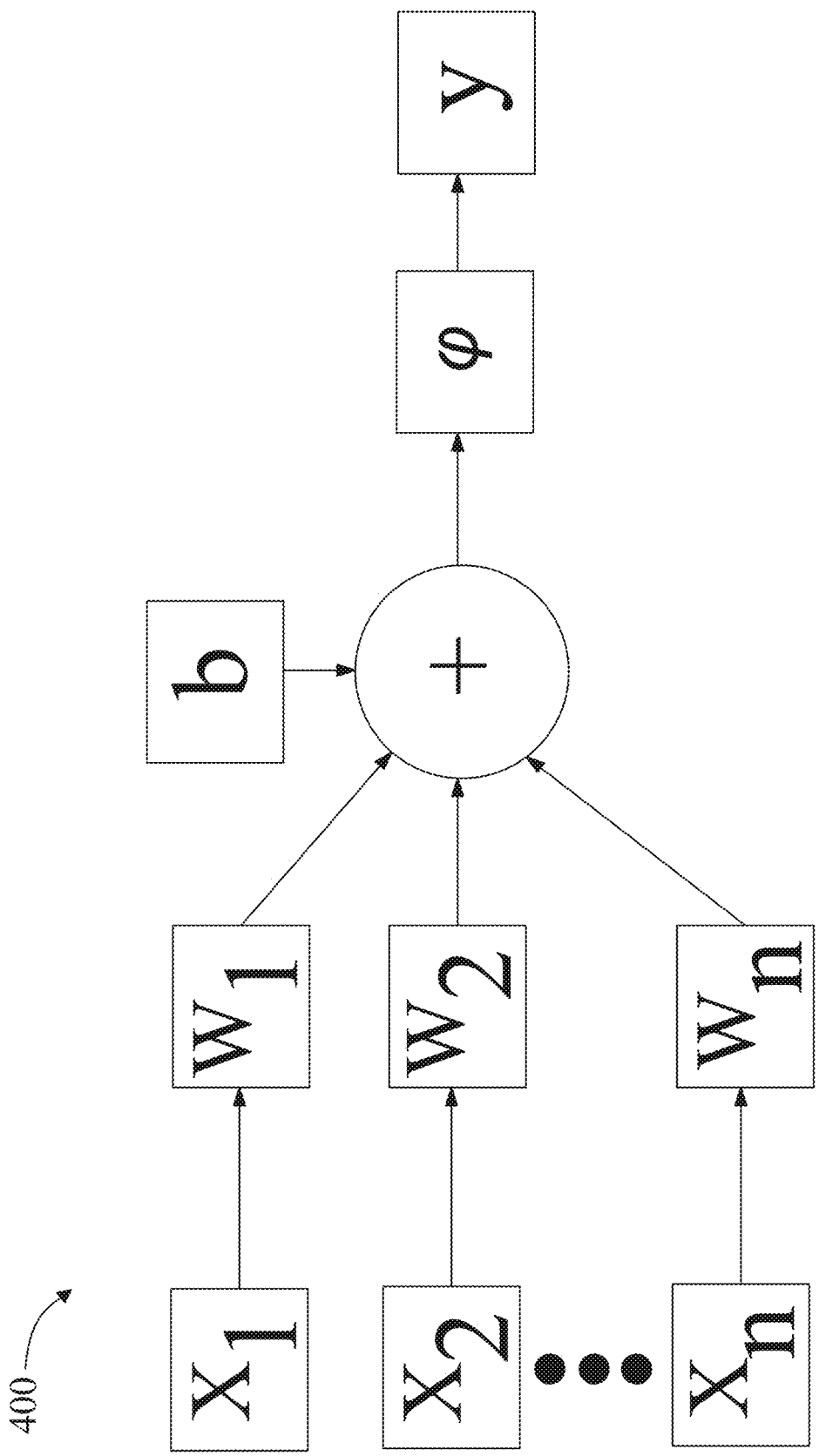
FIG. 4 illustrates a block diagram illustrating an exemplary embodiment of a node in a neural network.

Referring now to FIG. 4, an exemplary embodiment of a node 400 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $e^x - e^{-x}/e^x + e^{-x}$, a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x*\text{sigmoid}(x)$, a Gaussian error linear unit function such as $f(x) = a(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
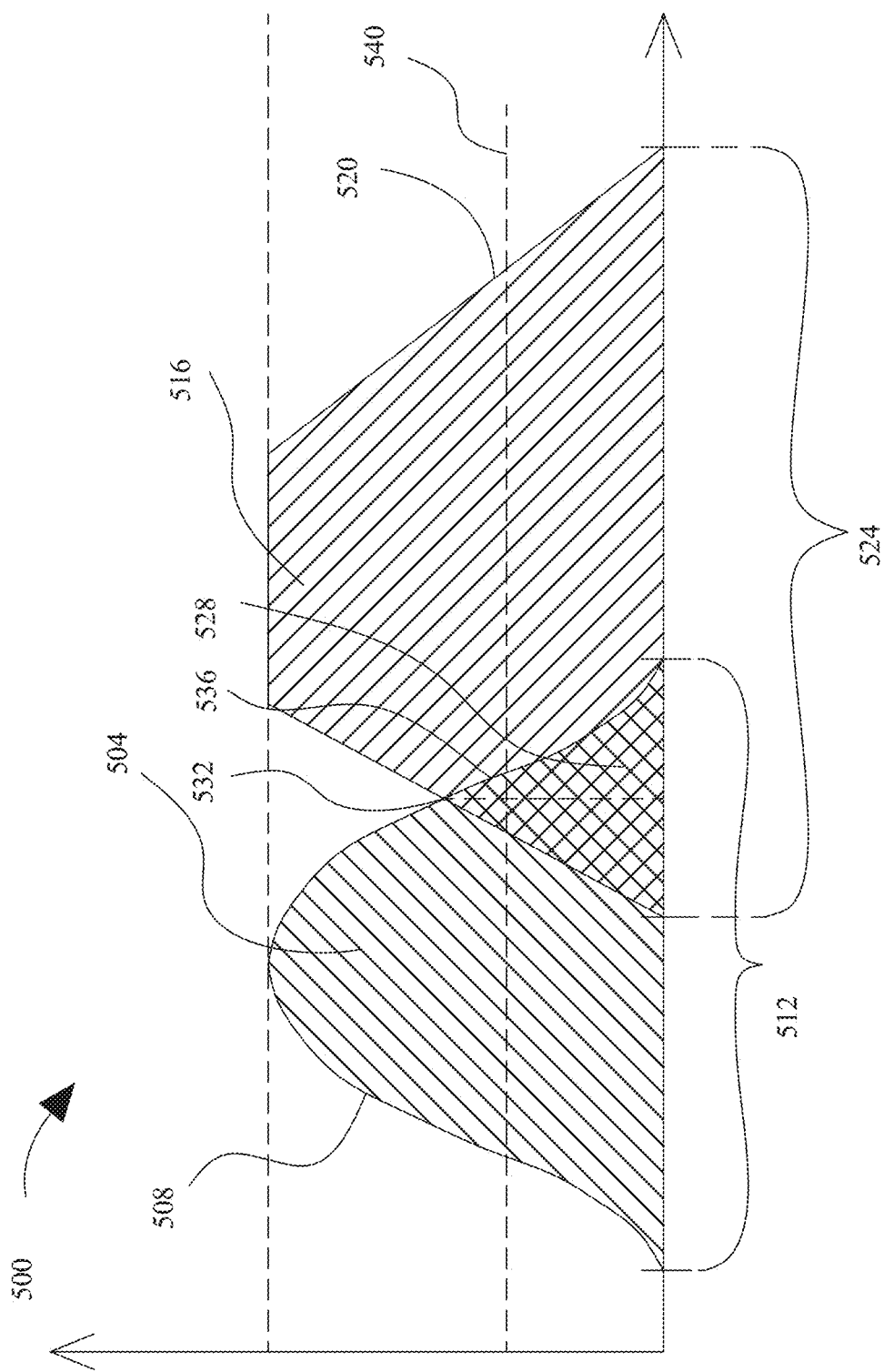
FIG. 5 illustrates a schematic diagram illustrating an exemplary embodiment of a fuzzy inferencing system.

Referring to FIG. 5, an exemplary embodiment of fuzzy set comparison 500 is illustrated. A first fuzzy set 504 may be represented, without limitation, according to a first membership function 508 representing a probability that an input falling in a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x - a}{b - a}, \text{ for } a \leq x < b \\ \frac{c - x}{c - b}, \text{ if } b < x \leq c \end{cases}$$

a trapezoidal membership function may be defined as:

$$y(x, a, b, c, d) = \max\left(\min\left(\frac{x - a}{b - a}, 1, \frac{d - x}{d - c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, entity data, and a predetermined class, such as without limitation of cybersecurity threat classification. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or entity data and a predetermined class, such as without limitation cybersecurity threat classification categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify an entity data with cybersecurity threat classification. For instance, if a cybersecurity threat classification has a fuzzy set matching entity data fuzzy set by having a degree of overlap exceeding a threshold, processor 104 may classify the entity data as belonging to the cybersecurity threat classification categorization. Where multiple fuzzy matches are performed, degrees of match for each respective fuzzy set may be computed and aggregated through, for instance, addition, averaging, or the like, to determine an overall degree of match.

Still referring to FIG. 5, in an embodiment, an entity data may be compared to multiple cybersecurity threat classification categorization fuzzy sets. For instance, entity data may be represented by a fuzzy set that is compared to each of the multiple cybersecurity threat classification categorization fuzzy sets; and a degree of overlap exceeding a threshold between the entity data fuzzy set and any of the multiple cybersecurity threat classification categorization fuzzy sets may cause processor 104 to classify the entity data as belonging to cybersecurity threat classification categorization. For instance, in one embodiment there may be two cybersecurity threat classification categorization fuzzy sets, representing respectively cybersecurity threat classification categorization and cybersecurity threat classification categorization. First cybersecurity threat classification categorization may have a first fuzzy set; Second cybersecurity threat classification categorization may have a second fuzzy set; and entity data may have an entity data fuzzy set. processor 104, for example, may compare an entity data fuzzy set with each of cybersecurity threat classification categorization fuzzy set and in cybersecurity threat classification categorization fuzzy set, as described above, and classify entity data to either, both, or neither of cybersecurity threat classification categorization nor in cybersecurity threat classification categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, entity data may be used indirectly to determine a fuzzy set, as entity data fuzzy set may be derived from outputs of one or more machine-learning models that take the entity data directly or indirectly as inputs.

Still referring to FIG. 5, a computing device may use a logic comparison program, such as, but not limited to, a fuzzy logic model to determine a cybersecurity threat classification response. An cybersecurity threat classification response may include, but is not limited to, different type of cybersecurity threat such as, without limitation, "malware," "social engineering," "phishing," "ransomware," and or the like; each such cybersecurity threat classification response may be represented as a value for a linguistic variable representing cybersecurity threat classification response or in other words a fuzzy set as described above that corresponds to a degree of match of cybersecurity threat classification as calculated using any statistical, machine-learning, or other method that may occur to a person skilled in the art upon reviewing the entirety of this disclosure. In other words, a given element of entity data may have a first non-zero value for membership in a first linguistic variable value and a second non-zero value for membership in a second linguistic variable value. In some embodiments, determining a cybersecurity threat classification categorization may include using a linear regression model. A linear regression model may include a machine learning model. A linear regression model may be configured to map data of entity data, such as degree of . . . to one or more cybersecurity threat classification parameters. A linear regression model may be trained using a machine learning process. A linear regression model may map statistics such as, but not limited to, quality of entity data. In some embodiments, determining a cybersecurity threat classification of entity data may include using a cybersecurity threat classification model. A cybersecurity threat classification model may be configured to input collected data and cluster data to a centroid based on, but not limited to, frequency of appearance, linguistic indicators of quality, and the like. Centroids may include scores assigned to them such that quality of entity data may each be assigned a score. In some embodiments cybersecurity threat classification model may include a K-means clustering model. In some embodiments, cybersecurity threat classification model may include a particle swarm optimization model. In some embodiments, determining the cybersecurity threat classification of an entity data may include using a fuzzy inference engine. A fuzzy inference engine may be configured to map one or more entity data elements using fuzzy logic. In some embodiments, entity data may be arranged by a logic comparison program into cybersecurity threat classification arrangement. An "cybersecurity threat classification arrangement" as used in this disclosure is any grouping of objects and/or data based on skill level and/or output score. This step may be implemented as described above in FIGS. 1-4. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented according to input and/or output membership functions and/or linguistic variables. For instance, a first linguistic variable may represent a first measurable value pertaining to entity data, such as a degree of match of cybersecurity threat classification, while a second membership function may indicate a degree of in cybersecurity threat classification of a subject thereof, or another measurable value pertaining to entity data. Continuing the example, an output linguistic variable may represent, without limitation, a score value. An inference engine may combine rules, such as: "if the number of cybersecurity vulnerability is 'high" and the defense difficulty is 'high', the cybersecurity risk score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 6:
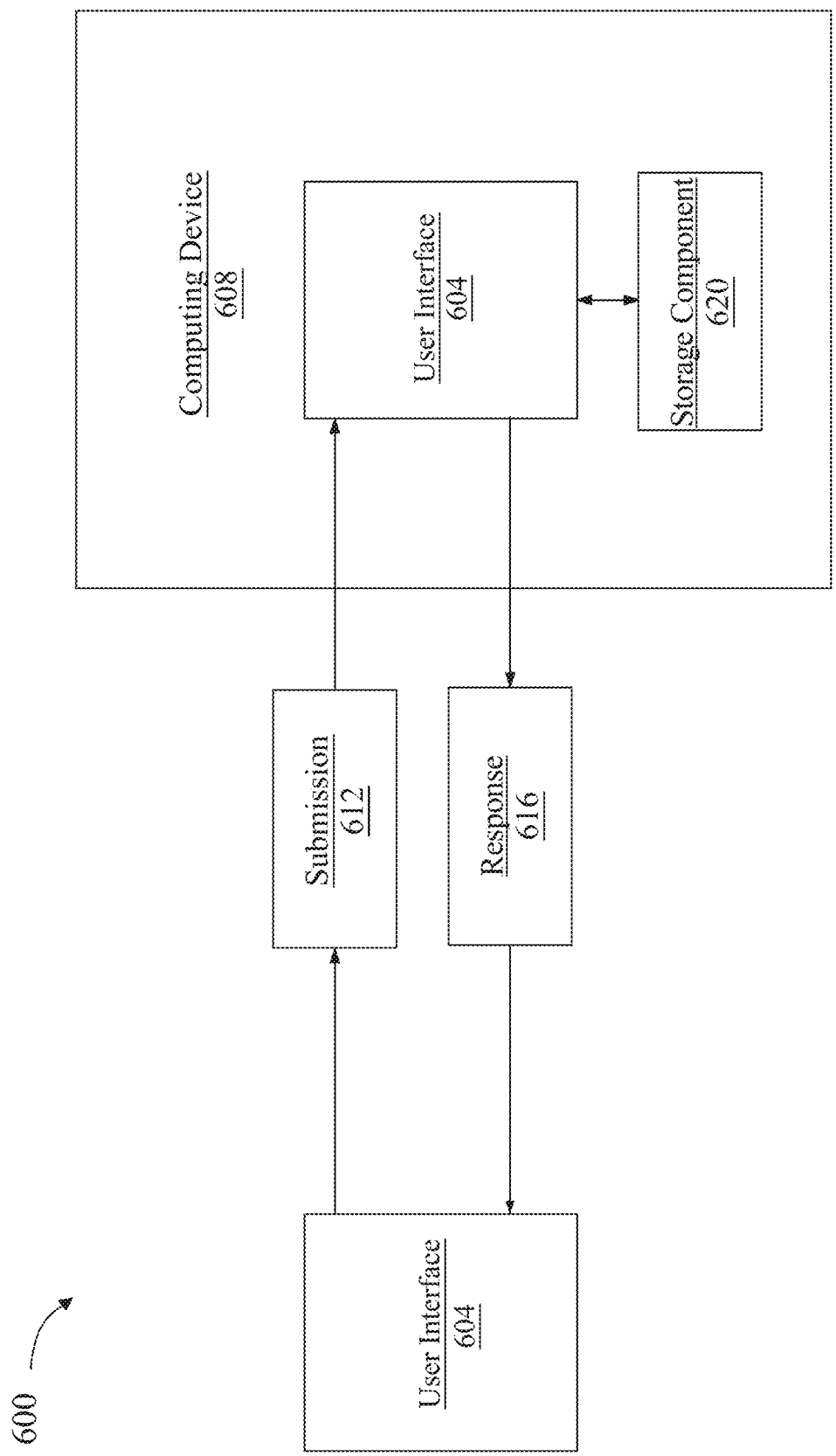
FIG. 6 illustrates a block diagram of chatbot system.

Referring to FIG. 6, a chatbot system 600 is schematically illustrated. In some embodiments, chatbot system 600 may be consistent with chatbot 180. According to some embodiments, a user interface 604 may be communicative with a computing device 608 that is configured to operate a chatbot. In some embodiments, user interface 604 disclosed herein may be consistent with visual interface 172. In some cases, user interface 604 may be local to computing device 608. The computing device 608 may be consistent with processor 104. Alternatively or additionally, in some cases, user interface 604 may remote to computing device 608 and communicative with the computing device 608, by way of one or more networks, such as without limitation the internet. Alternatively or additionally, user interface 604 may communicate with user device 608 using telephonic devices and networks, such as without limitation fax machines, short message service (SMS), or multimedia message service (MMS). In some embodiments, user device 608 may be consistent with entity device described with respect to FIG. 1. Commonly, user interface 604 communicates with computing device 608 using text-based communication, for example without limitation using a character encoding protocol, such as American Standard for Information Interchange (ASCII). Typically, a user interface 604 conversationally interfaces a chatbot, by way of at least a submission 612, from the user interface 608 to the chatbot, and a response 616, from the chatbot to the user interface 604. In many cases, one or both of submission 612 and response 616 are text-based communication. Alternatively or additionally, in some cases, one or both of submission 612 and response 616 are audio-based communication.

Continuing in reference to FIG. 6, a submission 612 once received by computing device 608 operating a chatbot, may be processed by a processor. In some embodiments, processor processes a submission 612 using one or more of keyword recognition, pattern matching, and natural language processing. In some embodiments, processor employs real-time learning with evolutionary algorithms. In some cases, processor may retrieve a pre-prepared response from at least a storage component 620, based upon submission 612. Alternatively or additionally, in some embodiments, processor communicates a response 616 without first receiving a submission 612, thereby initiating conversation. In some cases, processor communicates an inquiry to user interface 604; and the processor is configured to process an answer to the inquiry in a following submission 612 from the user interface 604. In some cases, an answer to an inquiry present within a submission 612 from a user device 604 may be used by computing device 608 as an input to another function.

With continued reference to FIG. 6, a chatbot may be configured to provide an entity with a plurality of options as an input into the chatbot. Chatbot entries may include multiple choice, short answer response, true or false responses, and the like. An entity may decide on what type of chatbot entries are appropriate. In some embodiments, the chatbot may be configured to allow the user to input a freeform response into the chatbot. The chatbot may then use a decision tree, database, or other data structure to respond to the entities entry into the chatbot as a function of a chatbot input. As used in the current disclosure, "chatbot input" is any response that an entity inputs in to a chatbot as a response to a prompt or question. As a non-limiting example, chatbot input may include entity prompt 176, implementation of cyber-attack simulation 160 or cybersecurity enhancement program 148, or the like.

With continuing reference to FIG. 6, computing device 608 may be configured to the respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least an input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 608 may generate two or more decision trees, which may overlap; for instance, a root node of one tree may connect to and/or receive output from one or more terminal nodes of another tree, intermediate nodes of one tree may be shared with another tree, or the like.

Still referring to FIG. 6, computing device 608 may build decision tree by following relational identification; for example, relational indication may specify that a first rule module receives an input from at least a second rule module and generates an output to at least a third rule module, and so forth, which may indicate to computing device 608 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 608 may generate connections and/or combinations of one or more trees to one another to define overlaps and/or combinations into larger trees and/or combinations thereof. Such connections and/or combinations may be displayed by visual interface to entity, for instance in first view, to enable viewing, editing, selection, and/or deletion by entity; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 6, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 7:
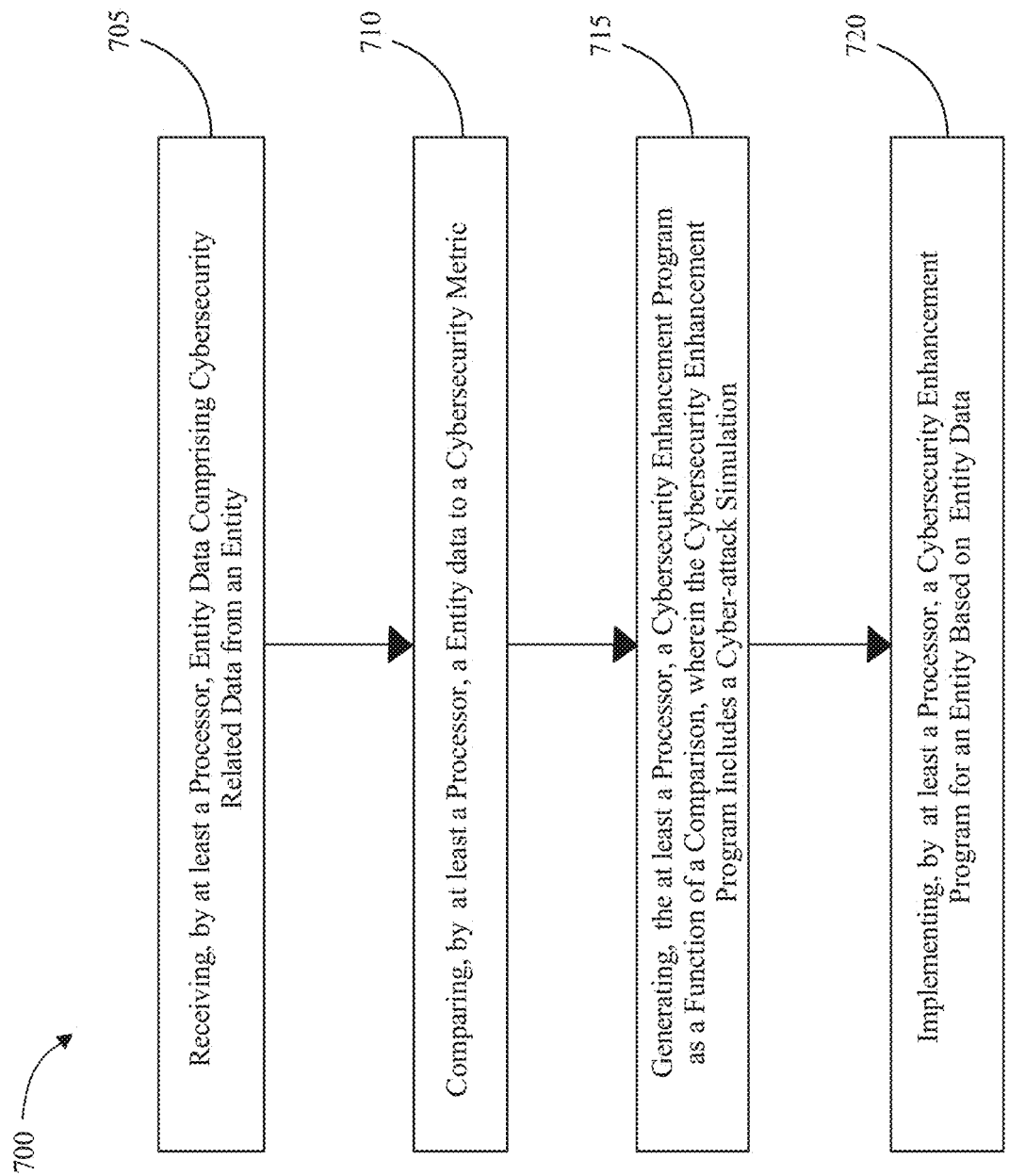
FIG. 7 illustrates a schematic diagram of an exemplary embodiment of a method for enhancing cybersecurity for an entity.

Now referring to FIG. 7, an exemplary embodiment of a method 700 for enhancing cybersecurity for an entity. Method 700 includes a step 705 of receiving, by at least a processor, entity data containing cybersecurity related data from an entity, without limitation, as described above in reference to FIGS. 1-6. In some embodiments, the cybersecurity related data may include entity operation data. This may be implemented, without limitation, as described above in reference to FIGS. 1-6.

With continued reference to FIG. 7, method 700 includes a step 710 of comparing, by the at least a processor, the entity data to a cybersecurity metric, without limitation, as described above in reference to FIGS. 1-6. In some embodiments, step 710 of comparing the entity data to a cybersecurity metric may include generating identifying at least one cybersecurity threat classification as a function of the comparison. In some embodiments, identifying the at least one cybersecurity threat classification may include generating a cybersecurity threat classifier and classifying the entity data to at least one cybersecurity threat classification using the cybersecurity threat classifier. This may be implemented, without limitation, as described above in reference to FIGS. 1-6.

With continued reference to FIG. 7, method 700 includes a step 715 of generating, by the at least a processor, a cybersecurity enhancement program as a function of the comparison, without limitation, as described above in reference to FIGS. 1-6. In some embodiments, the cybersecurity enhancement program may include a cybersecurity training course for the entity. In some embodiments, cybersecurity enhancement program may include a cyber-attack simulation. This may be implemented without limitation, as described above in reference to FIGS. 1-6.

With continued reference to FIG. 7, method 700 includes a step 720 of implementing, by the at least a processor, the cybersecurity enhancement program for the entity based on the entity data, without limitation, as described above in reference to FIGS. 1-6. In some embodiments, step 720 of implementing the cybersecurity enhancement program may include performing the cyber-attack simulation using a cyber-attack simulation module. In some embodiments, generating a cybersecurity report as a function of the cyber-attack simulation. In some embodiments, step 720 of implementing the cybersecurity enhancement program may include updating the cybersecurity enhancement program as a function of the cybersecurity report. This may be implemented without limitation, as described above in reference to FIGS. 1-6.

Figure 8:
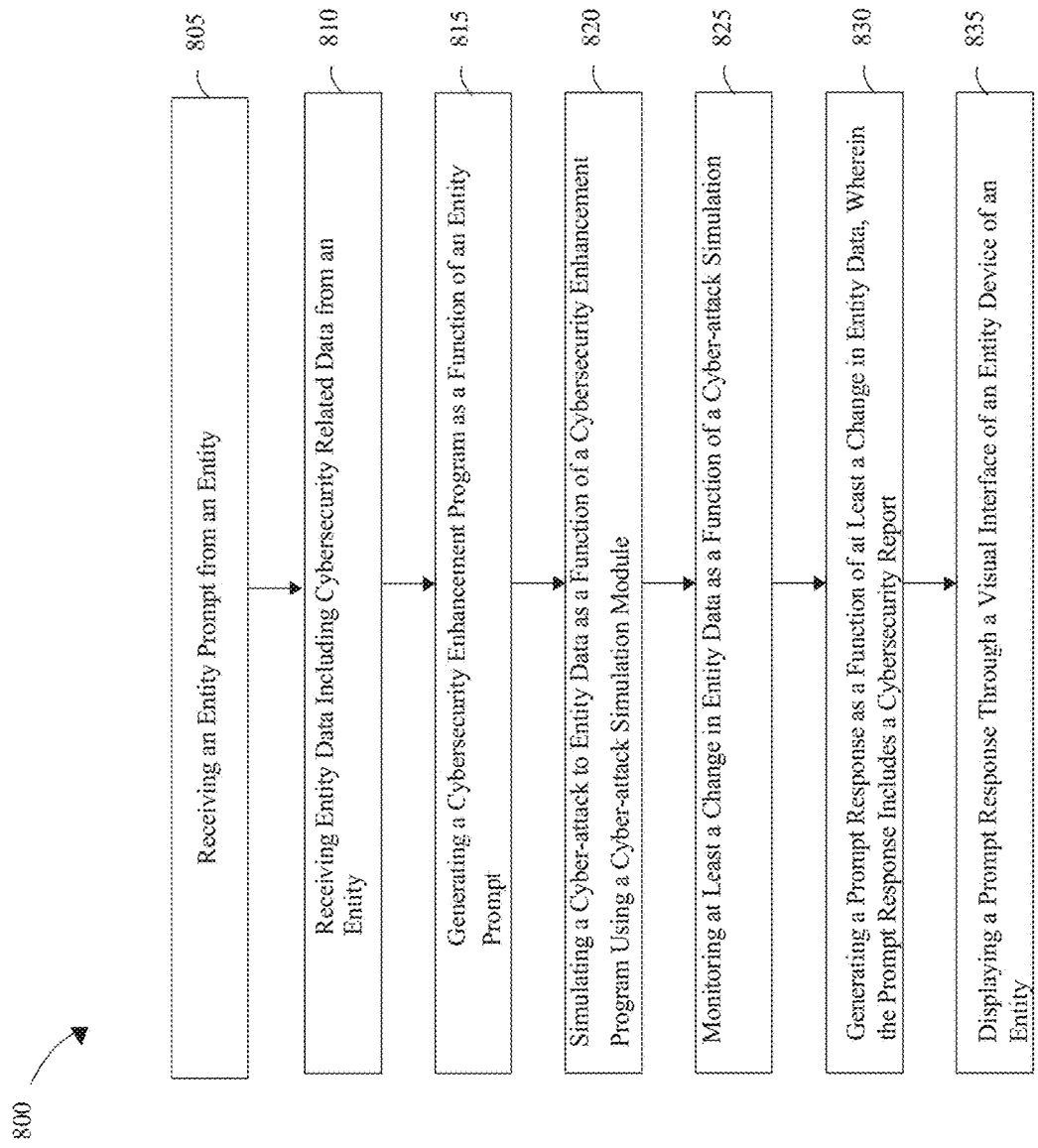
FIG. 8 illustrates a flow diagram of another exemplary method for enhancing cybersecurity for an entity.

Referring now to FIG. 8, a flow diagram of an exemplary method 800 is illustrated. Method 800 includes a step 805 of receiving, using at least a processor, an entity prompt from an entity. In some embodiments, method 800 may further include receiving, using the at least a processor, the entity prompt from a chatbot. In some embodiments, method 800 may further include identifying, using the at least a processor, a plurality of search patterns from the entity data and filtering, using the at least a processor, entity identification data from the entity data as a function of the plurality of search patterns using a secure gateway. These may be implemented as described with respect to FIGS. 1-7.

With continued reference to FIG. 8, method 800 includes a step 810 of receiving, using at least a processor, entity data including cybersecurity related data from an entity. These may be implemented as described with respect to FIGS. 1-7.

With continued reference to FIG. 8, method 800 includes a step 815 of generating, using at least a processor, a cybersecurity enhancement program as a function of an entity prompt, wherein generating the cybersecurity enhancement program includes comparing the entity data to a cybersecurity metric. In some embodiments, method 800 may further include generating, using the at least a processor, a cybersecurity threat classifier using cybersecurity training data, wherein the cybersecurity training data comprises a plurality of entity data as input correlated to a plurality of cybersecurity threat classifications as output, classifying, using the at least a processor, the entity data to at least one cybersecurity threat classification using the cybersecurity threat classifier and determining, using the at least a processor, a cybersecurity risk threshold as a function of the at least one cybersecurity threat classification. In some embodiments, method 800 may further include generating, using the at least a processor, a cybersecurity risk score as a function of the entity data using a fuzzy inferencing system and comparing, using the at least a processor, the cybersecurity risk score to the cybersecurity risk threshold. In some embodiments, method 800 may further include generating, using the at least a processor, a cybersecurity enhancement program classifier using cyber security enhancement program training data, wherein the cyber security enhancement program training data comprises a plurality of entity data and cybersecurity threat classifications as input correlated to a plurality of cybersecurity enhancement programs as output and determining, using the at least a processor, the cybersecurity enhancement programs as a function of the entity data and the output of the cybersecurity threat classifier using the trained cybersecurity enhancement program classifier. These may be implemented as described with respect to FIGS. 1-7.

With continued reference to FIG. 8, method 800 includes a step 820 of simulating, using at least a processor, a cyber-attack to entity data as a function of a cybersecurity enhancement program using a cyber-attack simulation module. In some embodiments, method 800 may further include inserting, using the at least a processor, a dumb agent in a data transfer between a first entity and a second entity, wherein the dumb agent is configured to analyze network traffic for insecure communication between the first entity and the second entity, receiving, using the at least a processor, an entity data packet from the first entity using the dumb agent and inserting, using the at least a processor, one or more harmless tokens to the entity data packet using the dumb agent. In some embodiments, method 800 may further include generating, using the at least a processor, malicious data for the entity at a predetermined time period using a language processing module and distributing, using the at least a processor, the malicious data to the entity. In some embodiments, method 800 may further include receiving, using the at least a processor, a plurality of responses regarding the malicious data from the entity, wherein the at least a change of the entity data comprises the plurality of responses and generating, using the at least a processor, the cybersecurity report as a function of the plurality of responses using a simulation statistical model. These may be implemented as described with respect to FIGS. 1-7.

With continued reference to FIG. 8, method 800 includes a step 825 of monitoring, using at least a processor, at least a change in entity data as a function of a cyber-attack simulation. These may be implemented as described with respect to FIGS. 1-7.

With continued reference to FIG. 8, method 800 includes a step 830 of generating, using at least a processor, a prompt response as a function of at least a change in the entity data, wherein a prompt response includes a cybersecurity report. In some embodiments, method 800 may further include updating, using the at least a processor, the cybersecurity enhancement program as a function of the cybersecurity report. These may be implemented as described with respect to FIGS. 1-7.

With continued reference to FIG. 8, method 800 includes a step 835 of displaying, using at least a processor, a prompt response through a visual interface of an entity device of an entity. These may be implemented as described with respect to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
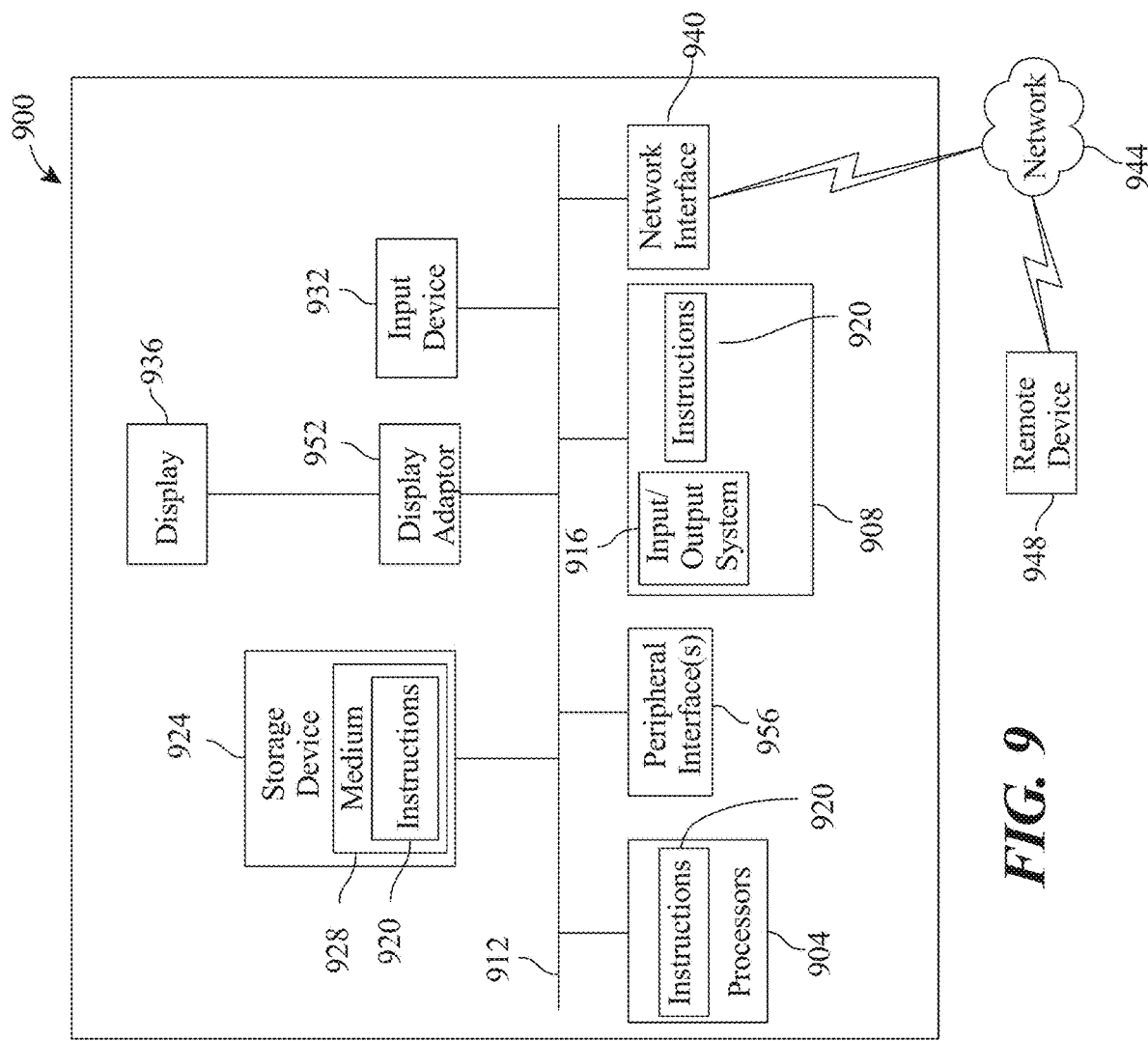
FIG. 9 illustrates a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for enhancing cybersecurity of an entity, wherein the apparatus comprises:
    at least a processor; and
    a memory communicatively connected to the at least a processor, wherein the memory containing instructions configuring the at least a processor to:
        receive an entity prompt from an entity;
        receive entity data comprising cybersecurity related data from the entity;
        generate a cybersecurity enhancement program as a function of the entity prompt, wherein generating the cybersecurity enhancement program comprises:
            comparing the entity data to a cybersecurity metric;
        simulate a cyber-attack to the entity data as a function of the cybersecurity enhancement program using a cyber-attack simulation module;
        monitor at least a change in the entity data as a function of the cyber-attack simulation;
        generate a cybersecurity report using a simulation statistical model, wherein generating the cybersecurity report using the simulation statistical model comprises:
            collecting a first set of responses to malicious data containing the at least a change in the entity data, wherein the at least a change in entity data comprises removing the malicious data;
            collecting a second set of responses to the malicious data containing the at least a change to entity data, wherein the at least a change to the entity data comprises the entity processing the malicious data; and
            comparing, in the cybersecurity report, a first count of the first set of responses to a second count of the second set of responses;
        generate a prompt response as a function of the at least a change in the entity data, wherein the prompt response comprises the cybersecurity report; and
        display the prompt response comprising the cybersecurity report through a visual interface of an entity device of the entity.

2. The apparatus of claim 1, wherein the memory contains the instructions further configuring the at least a processor to:
    identify a plurality of search patterns from the entity data; and
    filter entity identification data from the entity data as a function of the plurality of search patterns using a secure gateway.

3. The apparatus of claim 1, wherein the memory contains the instructions further configuring the at least a processor to:
    generate a cybersecurity threat classifier using cybersecurity training data, wherein the cybersecurity training data comprises a plurality of entity data as input correlated to a plurality of cybersecurity threat classifications as output;
    classify the entity data to at least one cybersecurity threat classification using the cybersecurity threat classifier; and
    determine a cybersecurity risk threshold as a function of the at least one cybersecurity threat classification.

4. The apparatus of claim 3, wherein the memory contains the instructions further configuring the at least a processor to:
    generate a cybersecurity risk score as a function of the entity data using a fuzzy inferencing system; and
    compare the cybersecurity risk score to the cybersecurity risk threshold.

5. The apparatus of claim 3, wherein the memory contains the instructions further configuring the at least a processor to:
    generate a cybersecurity enhancement program classifier using cyber security enhancement program training data, wherein the cyber security enhancement program training data comprises a plurality of entity data and cybersecurity threat classifications as input correlated to a plurality of cybersecurity enhancement programs as output; and
    determine the cybersecurity enhancement programs as a function of the entity data and the output of the cybersecurity threat classifier using the trained cybersecurity enhancement program classifier.

6. The apparatus of claim 1, wherein the memory contains the instructions further configuring the at least a processor to:
    insert a dumb agent in a data transfer between a first entity and a second entity, wherein the dumb agent is configured to analyze network traffic for insecure communication between the first entity and the second entity;

receive an entity data packet from the first entity using the dumb agent; and insert one or more harmless tokens to the entity data packet using the dumb agent.

7. The apparatus of claim 1, wherein the memory contains the instructions further configuring the at least a processor to:

generate malicious data for the entity at a predetermined time period using a language processing module; and distribute the malicious data to the entity.

8. The apparatus of claim 6, wherein the memory contains the instructions further configuring the at least a processor to:

receive a plurality of responses regarding the malicious data from the entity, wherein the at least a change of the entity data comprises the plurality of responses; and generate the cybersecurity report as a function of the plurality of responses using a simulation statistical model.

9. The apparatus of claim 1, wherein the memory contains the instructions further configuring the at least a processor to update the cybersecurity enhancement program as a function of the cybersecurity report.

10. The apparatus of claim 1, wherein at least a portion of the prompt response is generated using a generative adversarial network (GAN), wherein the GAN comprises:

a generative network configured to generate candidate data; and a discriminative network configured to evaluate the candidate data.

11. A method for enhancing cybersecurity of an entity, wherein the method comprises:

receiving, using at least a processor, an entity prompt from an entity;

receiving, using the at least a processor, entity data comprising cybersecurity related data from the entity;

generating, using the at least a processor, a cybersecurity enhancement program as a function of the entity prompt, wherein generating the cybersecurity enhancement program comprises:

comparing the entity data to a cybersecurity metric;

simulating, using the at least a processor, a cyber-attack to the entity data as a function of the cybersecurity enhancement program using a cyber-attack simulation module;

monitoring, using the at least a processor, at least a change in the entity data as a function of the cyber-attack simulation;

generating, using the at least a processor, a cybersecurity report using a simulation statistical model, wherein generating the cybersecurity report using the simulation statistical model comprises:

collecting a first set of responses to malicious data containing the at least a change in the entity data, wherein the at least a change in entity data comprises removing the malicious data;

collecting a second set of responses to the malicious data containing the at least a change to entity data, wherein the at least a change to the entity data comprises the entity processing the malicious data; and comparing, in the cybersecurity report, a first count of the first set of responses to a second count of the second set of responses;

generating, using the at least a processor, a prompt response as a function of the at least a change in the entity data, wherein the prompt response comprises the cybersecurity report; and displaying, using the at least a processor, the prompt response comprising the cybersecurity report through a visual interface of an entity device of the entity.

12. The method of claim 11, further comprising:

identifying, using the at least a processor, a plurality of search patterns from the entity data; and filtering, using the at least a processor, entity identification data from the entity data as a function of the plurality of search patterns using a secure gateway.

13. The method of claim 11, further comprising:

generating, using the at least a processor, a cybersecurity threat classifier using cybersecurity training data, wherein the cybersecurity training data comprises a plurality of entity data as input correlated to a plurality of cybersecurity threat classifications as output;

classifying, using the at least a processor, the entity data to at least one cybersecurity threat classification using the cybersecurity threat classifier; and determining, using the at least a processor, a cybersecurity risk threshold as a function of the at least one cybersecurity threat classification.

14. The method of claim 13, further comprising:

generating, using the at least a processor, a cybersecurity risk score as a function of the entity data using a fuzzy inferencing system; and comparing, using the at least a processor, the cybersecurity risk score to the cybersecurity risk threshold.

15. The method of claim 13, further comprising:

generating, using the at least a processor, a cybersecurity enhancement program classifier using cyber security enhancement program training data, wherein the cyber security enhancement program training data comprises a plurality of entity data and cybersecurity threat classifications as input correlated to a plurality of cybersecurity enhancement programs as output; and determining, using the at least a processor, the cybersecurity enhancement programs as a function of the entity data and the output of the cybersecurity threat classifier using the trained cybersecurity enhancement program classifier.

16. The method of claim 11, further comprising:

inserting, using the at least a processor, a dumb agent in a data transfer between a first entity and a second entity, wherein the dumb agent is configured to analyze network traffic for insecure communication between the first entity and the second entity;

receiving, using the at least a processor, an entity data packet from the first entity using the dumb agent; and inserting, using the at least a processor, one or more harmless tokens to the entity data packet using the dumb agent.

17. The method of claim 11, further comprising:

generating, using the at least a processor, malicious data for the entity at a predetermined time period using a language processing module; and distributing, using the at least a processor, the malicious data to the entity.

18. The method of claim 17, further comprising:

receiving, using the at least a processor, a plurality of responses regarding the malicious data from the entity, wherein the at least a change of the entity data comprises the plurality of responses; and generating, using the at least a processor, the cybersecurity report as a function of the plurality of responses using a simulation statistical model.

19. The method of claim 11, further comprising:

updating, using the at least a processor, the cybersecurity enhancement program as a function of the cybersecurity report.

20. The method of claim 11, wherein generating the prompt response comprises generating at least a portion of the prompt response using a generative adversarial network (GAN), wherein the GAN comprises:

a generative network configured to generate candidate data; and a discriminative network configured to evaluate the candidate data.

* * * * *